United States Patent
Park

(10) Patent No.: US 9,900,542 B2
(45) Date of Patent: Feb. 20, 2018

(54) COMPUTER PROCESSING DEVICE AND METHOD FOR PROVIDING COORDINATE COMPENSATION FOR A REMOTE CONTROL KEY AND DETECTING ERRORS BY USING USER PROFILE INFORMATION BASED ON FORCE INPUTS

(71) Applicant: HUMAX CO., LTD., Yongin (KR)

(72) Inventor: Sung Heum Park, Yongin (KR)

(73) Assignee: HUMAX CO., LTD., Yongin (KR)

( * ) Notice: Subject to any disclaimer, the term of this patent is extended or adjusted under 35 U.S.C. 154(b) by 0 days.

(21) Appl. No.: 15/254,270

(22) Filed: Sep. 1, 2016

(65) Prior Publication Data

US 2017/0332031 A1   Nov. 16, 2017

(30) Foreign Application Priority Data

May 16, 2016 (KR) ........................ 10-2016-0059575

(51) Int. Cl.
| | |
|---|---|
| H04N 5/44 | (2011.01) |
| H04N 21/422 | (2011.01) |
| H04N 21/45 | (2011.01) |
| H04N 21/442 | (2011.01) |

(52) U.S. Cl.
CPC ..... *H04N 5/4403* (2013.01); *H04N 21/42222* (2013.01); *H04N 21/44231* (2013.01); *H04N 21/4532* (2013.01); *H04N 2005/4428* (2013.01); *H04N 2005/4444* (2013.01)

(58) Field of Classification Search
CPC ............. H04N 5/4403; H04N 21/4222; H04N 21/4231; H04N 21/4532; H04N 2005/4428; H04N 2005/4444

USPC .......................................................... 348/734
See application file for complete search history.

(56) References Cited

U.S. PATENT DOCUMENTS

| 7,302,350 B2 * | 11/2007 | Gombert ............... G06F 3/0338 345/163 |
|---|---|---|
| 2011/0057886 A1 * | 3/2011 | Ng ........................ G06F 3/0482 345/173 |
| 2011/0248948 A1 * | 10/2011 | Griffin .................... G06F 3/041 345/174 |

FOREIGN PATENT DOCUMENTS

| KR | 10-2010-0136618 A | 12/2010 |
|---|---|---|
| KR | 10-2012-0068429 A | 6/2012 |

* cited by examiner

*Primary Examiner* — Michael Lee

(57) ABSTRACT

Provided are a computer processing device and a method for providing coordinate compensation and determining errors by using user profile information based on force inputs. The computer processing device includes an information collector unit and an analysis unit. The information collector unit collects information on various inputs entered on a key of a remote control. From among the inputs entered on a same key, the analysis unit compensates an input that corresponds to a level lying in-between a first level and a second level, the first level corresponding to a normal input and the second level corresponding to a force input, in such a way that the input is compensated to be a normal input or a force input. Here, the force input is an input entered with a greater pressure or a larger area than for the normal input on the key of the remote control.

5 Claims, 19 Drawing Sheets

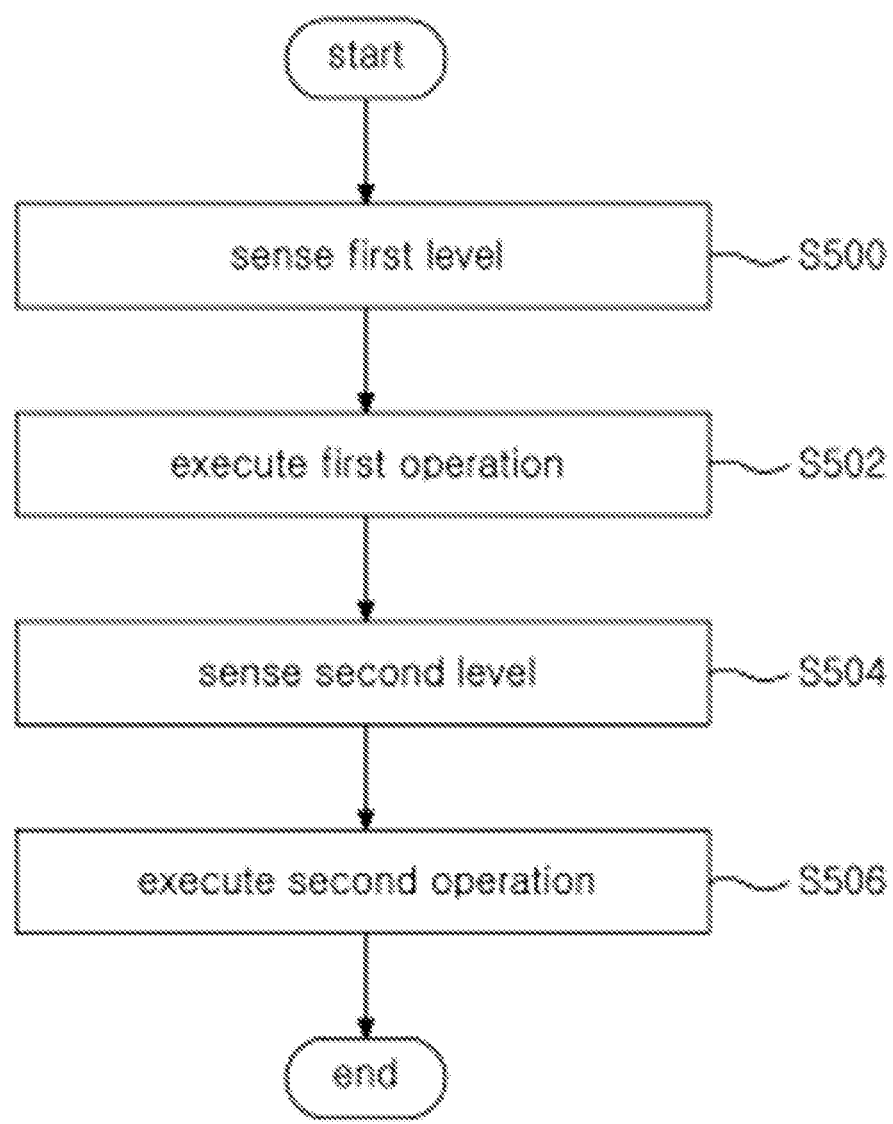

600

600

COMPUTER PROCESSING DEVICE AND METHOD FOR PROVIDING COORDINATE COMPENSATION FOR A REMOTE CONTROL KEY AND DETECTING ERRORS BY USING USER PROFILE INFORMATION BASED ON FORCE INPUTS

PRIORITY

This application claims priority under 35 U.S.C. § 119(a) to a Korean patent application filed on May 16, 2016 in the Korean Intellectual Property Office and assigned Serial No. 10-2016-0059575, the entire disclosure of which is incorporated herein by reference.

BACKGROUND

1. Field of the Invention

The present disclosure relates to a technology for providing coordinate compensation for a remote control's key and determining service errors by using user profile information based on force inputs.

2. Description of the Related Art

A set-top box is a device that connects to a TV set and suitably converts video and voice signals received from the outside to display the contents via the TV set.

In addition to regular TV broadcast ground waves, the set-top box can receive signals such as IPTV, cable TV, or satellite TV signals, etc., and display such signals on the TV set.

The set-top box is typically equipped with a remote control, which the user can manipulate to remotely control the set-top box.

As the types of content services provided via IPTV, cable TV, satellite TV, etc., are becoming more varied, so too have the functions provided by a set-top box or a TV set become more varied. This has also led to an increased number of buttons provided on the remote control.

While it is desirable to provide the user with more varied contents and services, there is the inconvenience that the user has to know the function of each of the numerous buttons arranged on the remote control in order to fully enjoy the contents and services.

Also, because of the large number of buttons on the remote control, it may be difficult for the user to manipulate the remote control while keeping his/her eyes fixed on the TV screen (blind control), and the user may have to turn his/her eyes towards the remote control every time a manipulation is made on the remote control. As such, manipulating the remote control may incur many distractions for a user viewing a content.

Thus, there is a demand for methods of minimizing the number of buttons on a remote control intended for using various content services, as this would allow users to readily learn how to use the remote control and allows blind control when manipulating the remote control.

In particular, there is a demand for a method of providing customized services while providing a minimum number of buttons on the remote control.

SUMMARY

The invention has been made to address at least the disadvantages and problems described above, and to provide at least the advantages described below. An aspect of the invention is to provide a way to enable coordinate compensation for a remote control key and detect service-related errors when setting a user profile by using force inputs on a remote control.

To achieve the objective above, an embodiment of the invention provides a computer processing device that includes an information collector unit and an analysis unit. The information collector unit is configured to collect information on various inputs entered by way of a key of a remote control. From among the inputs entered on a same key, the analysis unit compensates an input that corresponds to a level lying in-between a first level and a second level, the first level corresponding to a normal input and the second level corresponding to a force input, in such a way that the input is compensated to be a normal input or a force input. Here, the force input is an input entered with a greater pressure or a larger area than for the normal input on the key of the remote control.

To achieve the objective above, another embodiment of the invention provides a computer processing device that includes an information collector unit and a profiling unit. The information collector unit is configured to collect information on an input entered on a key of a remote control with an uncompensated sensing level and an input entered on a key of a remote control with a compensated sensing level, where the information collector unit collects at least one force input. The profiling unit is configured to create at least one user profile information depending on the collected information. The input with the compensated sensing level is an input generated by compensating an input that corresponds to a level lying in-between a first level and a second level from among the inputs entered by way of the key of the remote control, the first level corresponding to a normal input and the second level corresponding to a force input, in such a way that the input is compensated to be a normal input or a force input. Here, the force input is an input entered with a greater pressure or a larger area than for the normal input on the key of the remote control.

To achieve the objective above, yet another embodiment of the invention provides a computer processing device that includes an information collector unit, an analysis unit, and a control unit. The information collector unit is configured to collect information on a normal input or a force input, where the normal input and the force input relate to the sensing levels for a selected key on a remote control. The analysis unit is configured to set user profile information depending on the collected information, and is configured to determine whether or not a service error has occurred when a sensing level inputted via the remote control deviates from a sensing level set for the user profile information. The control unit is configured to output information indicating the service error when it is determined that a service error has occurred. Here, the user profile information includes a profile created for each user depending on normal inputs or force inputs collected during a preset period of time, and the force input is an input entered with a greater pressure or a larger area than for the normal input on the key of the remote control.

To achieve the objective above, an embodiment of the invention provides a method for compensating a sensing level for a remote control key that is performed at a computer processing device. The method includes: collecting information on various inputs entered by way of a key of a remote control; compensating an input corresponding to a level lying in-between a first level corresponding to a normal input and a second level corresponding to a force input to be either the normal input or the force input, from among the inputs entered on a same key, where the force input is an input entered with a greater pressure or a larger area than for the normal input on the key of the remote control.

To achieve the objective above, an embodiment of the invention provides a method of determining a service error that is performed at a computer processing device. The method includes: collecting information on a normal input or a force input, the normal input and the force input relating to sensing levels of a selected key on a remote control; setting user profile information depending on the collected information and determining whether or not a service error has occurred when a sensing level inputted via the remote control deviates from a sensing level set for the user profile information; and outputting information indicating the service error when it is determined that a service error has occurred, where the user profile information includes a profile created for each user depending on normal inputs or force inputs collected during a preset period of time, and the force input is an input entered with a greater pressure or a larger area than for the normal input on the key of the remote control.

A remote control for a media system according to an embodiment of the invention can provide not only normal inputs but also force inputs, so that a variety of functions for an image processing terminal, such as a set-top box, TV set, etc., can be matched with the respective inputs.

Consequently, the various functions of the image processing terminal can be controlled with a minimal number of keys implemented on the remote control.

Also, a media system according to an embodiment of the invention can create user profiles based on an analysis of the force inputs entered into the remote control, and the coordinates of the keys on the remote control can be compensated to be optimized for the user.

Moreover, by analyzing the force inputs entered into the remote control, problems such as service errors, etc., can be quickly recognized and resolved.

BRIEF DESCRIPTION OF DRAWINGS

The aspects, features, advantages and embodiments of the invention will be more apparent from the following detailed description taken in conjunction with reference to the accompanying drawings, in which:

FIG. 5 is a flowchart conceptually illustrating the operations of a media system according to an embodiment of the invention.

DETAILED DESCRIPTION

In the present specification, an expression used in the singular encompasses the expression of the plural, unless it has a clearly different meaning in the context.

In the present specification, terms such as "comprising" or "including," etc., should not be interpreted as meaning that all of the elements or steps are necessarily included. That is, some of the elements or steps may not be included, while other additional elements or steps may be further included.

Also, terms such as "unit" or "module," etc., refers to a unit subject that processes at least one function or action, and such unit subject can be implemented as hardware or software or a combination of hardware and software.

Various embodiments of the present invention are described below in more detail with reference to the accompanying drawings.

The present invention relates to a media system that includes an image processing terminal, a remote control for controlling the image processing terminal, and a server.

Here, the image processing terminal can be a display device such as a TV set that displays images or an apparatus such as a set-top box that transmits image signals to a display device.

That is, the image processing terminal is not particularly limited in type as long as it is an apparatus related to image processing, and can be, for example, a TV set having a set-top function or a set-top box itself.

A remote control according to an embodiment of the invention may include at least one key and may provide the image processing terminal with a control signal that carries information on the level of the key selected by the user.

In this case, the image processing terminal can perform a different function or process a different screen depending on the level of the key.

Here, the key can be a physically implemented key such as a dome key, etc., or can be a software implemented key.

The server can compensate the coordinate for the remote control's key to be optimized for the user, when creating a user profile according to inputs, especially force inputs (described later on), from the remote control, and can analyze force inputs to recognize problems such as service errors, etc., and allow a quick resolution thereof.

Various embodiments of the present invention are described below in more detail with reference to the accompanying drawings.

Figure 1:
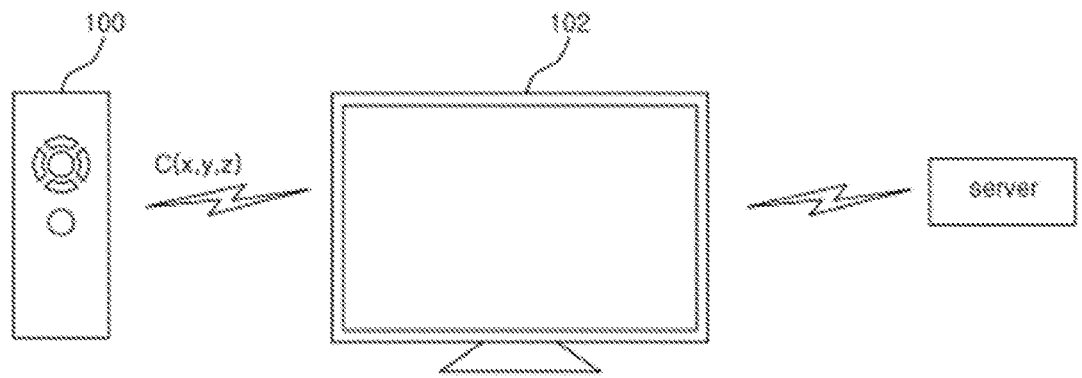
FIG. 1 illustrates a media system according to an embodiment of the invention.
Figure 2A:
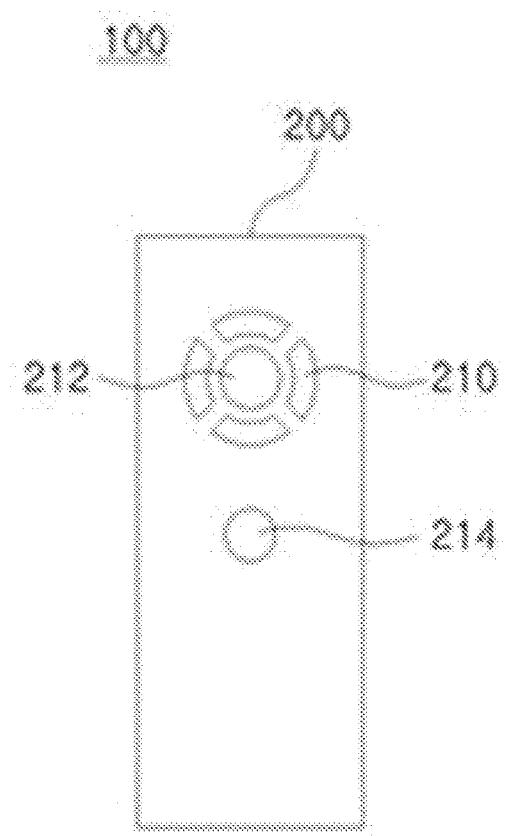
FIG. 2A conceptually illustrates a remote control according to an embodiment of the invention.
Figure 2B:
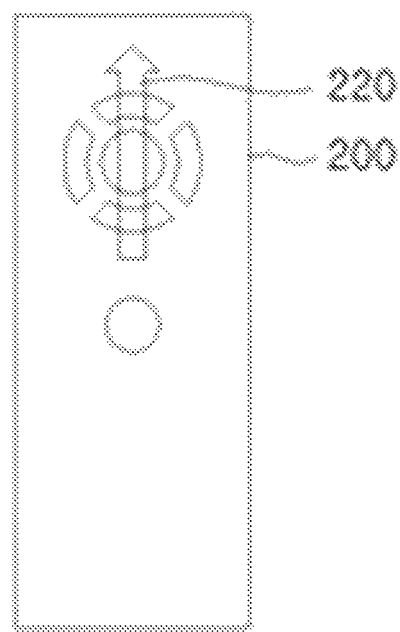
FIG. 2B illustrates a gesture according to one embodiment of the invention.
Figure 3:
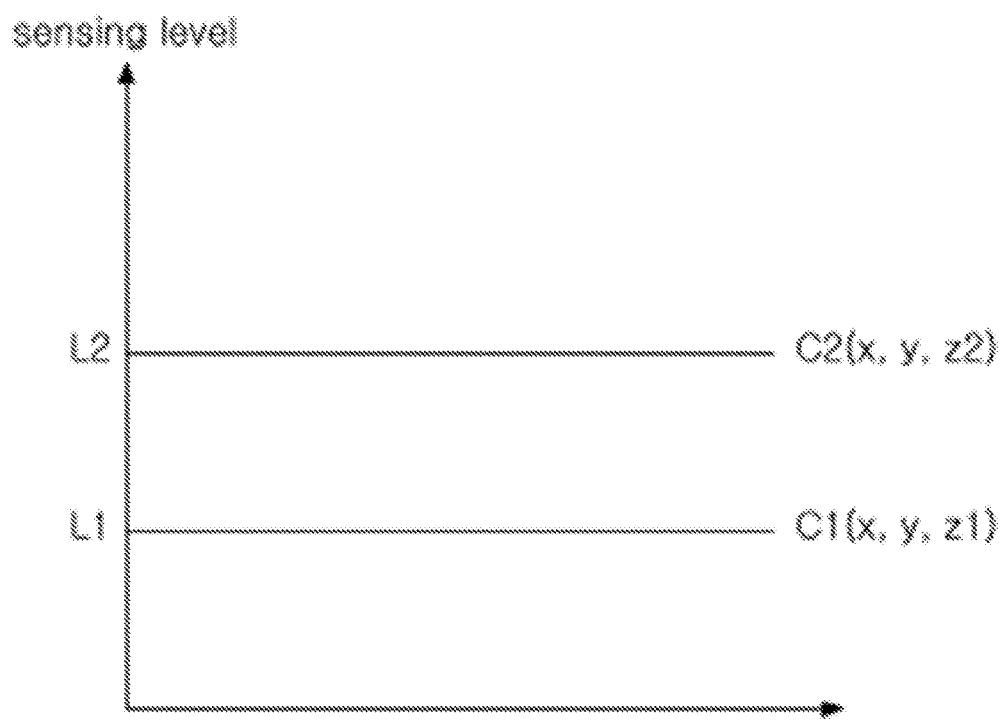
FIG. 3 illustrates the control operations of a remote control according to an embodiment of the invention.

FIG. 1 illustrates a media system according to an embodiment of the invention, FIG. 2A conceptually illustrates a remote control according to an embodiment of the invention, FIG. 2B illustrates a gesture according to one embodiment of the invention, and FIG. 3 illustrates the control operations of a remote control according to an embodiment of the invention. It is noted that FIG. 2A shows a remote control having keys that are implemented by software means.

Referring to FIG. 1, the media system according to an embodiment of the invention may include a remote control 100, an image processing terminal 102, and a server 104. Here, since the server 104 is an apparatus that uses a processor to process various data, it can also be referred to as a computer processing device.

According to an embodiment of the invention, the remote control 100 can include a body 200 and several keys formed on the body 200, including: navigation keys 210, which may be related to the upward, downward, left, and right directional keys; a function key 214 for executing a particular operation such as in regard to an ESC key, a home menu, and the like; and a decision key 212 for deciding on an execution of an operation such as in regard to an OK key.

While various keys can be provided on the remote control 100, these keys can be classified as navigation keys 210, decision keys 212, and function keys 214.

Such remote control 100 can be wirelessly connected with the image processing terminal 102 and may control the operation of the image processing terminal 102.

For example, the remote control 100 can control the program guide on the image processing terminal 102, which may be for example a TV set.

According to an embodiment of the invention, at least one of the keys of the remote control 100 can be set to have functions related to two or more operations of the image processing terminal 102.

More specifically, the remote control 100 can transmit to the image processing terminal 102 a control signal for executing a different operation according to the pressure or area by which a key is pressed using a touch means such as a finger, etc.

Here, the sensing level of the remote control 100 may differ according to the pressure or area of pressing the key, and as such, the remote control 100 can transmit a different control signal, according to the sensing level for the key, to the image processing terminal 102.

Inputs entered by a touch means into the remote control 100 can include normal inputs and force inputs.

Here, a normal input refers to an input associated with a user pressing a key in a typical manner. In this case, a typical operation set for the key of the remote control 100 may be performed in the same manner as for an existing remote control. For example, if the UP key is pressed, an UP operation may be executed.

A force input refers to an input entered by pressing a key with greater force or over a larger area compared to a normal input. In this case, the operation or the screen of the image processing terminal 102 may be different from the operation or screen of the image processing terminal 102 for a normal input.

If a normal input is made for a longer duration of time (i.e. a long press), this operation can still be perceived as a normal input rather than a force input. Various embodiments related to this feature will be described later on.

According to another embodiment, supposing that the coordinates of a key on the remote control 100 selected with a touch means are (x, y), then the information on the sensing level can be expressed as a z-axis value.

That is, by using 3-dimensional coordinates (x, y, z), both the coordinates of the selected key and the information regarding the sensing level can be expressed at the same time.

Of course, it is possible to express the coordinates of a selected key and the information on the sensing level using various methods other than the method of using (x, y, z), and it is also possible to use coordinates of 4 dimensions or higher instead of 3-dimensional coordinates.

Thus, when a user selects a particular key at a particular sensing level, the remote control 100 can transmit a control signal to the image processing terminal 102, with the control signal including the coordinates (x, y) corresponding to the particular key and a z value related to the sensing level.

That is, the remote control 100 can transmit a control signal C(x, y, z) to the image processing terminal 102.

For example, if the user selects a navigation key 210 corresponding to a right directional key with a first sensing level (normal input), then the remote control 100 may transmit a control signal C1 having coordinates (x, y, z1) to the image processing terminal 102, and if the user presses the navigation key 210 with a greater force, for example selecting the navigation key 210 with a second sensing level (force input), then the remote control 100 may transmit a control signal C2 having coordinates (x, y, z2) to the image processing terminal 102.

Here, the image processing terminal 102 can execute a different operation depending on the control signal.

For example, the image processing terminal 102 can execute the operation of displaying a program guide according to a first control signal C1 and can execute the operation of displaying a recommended program list according to a second control signal C2.

That is, the sensing level can be set according to the force or area by which the user presses a key on the remote control 100, and the image processing terminal 102 can execute a different operation according to the sensing level.

Of course, in cases where the image processing terminal 102 is a TV set, it can perform an operation of displaying a program guide, etc., but in cases where the image processing terminal 102 is a set-top box, it would perform an operation of transmitting image signals related to the program guide, etc., to the TV set.

The remote control 100 can send a control signal that includes a direct command to operate a particular function, but in certain embodiments, the remote control 100 can transmit a control signal that includes only the coordinate (x, y, z) to the image processing terminal 102.

In this case, the operation related to the coordinate (x, y, z) can be determined at the image processing terminal 102.

Therefore, even if the remote control 100 transmits the same coordinate to the image processing terminal 102, the image processing terminal 102 can execute a different operation according to the installed software.

In some embodiments, force inputs can be divided into "force up" inputs and "force down" inputs.

According to an embodiment of the invention, entering a force input on the navigation key 210 for the UP directional key can be set as a force up input, and entering a force input on the DOWN directional key can be set as a force down input.

For example, from a typical home screen, if a force input is entered on the UP directional key, recommended programs can be presented, and if a force input is entered on the DOWN directional key, a VOD list can be shown.

In this case, by entering a force input on the UP directional key from the home screen, a user can have the recommended programs shown, and by subsequently entering a force input on the DOWN directional key, the user can move back to the home screen. By entering a force input on the DOWN directional key again from the home screen, the user can have the VOD list shown.

In another embodiment, a force input applied on the same key can be set as a force up input if the sensing level reaches a second sensing level and can be set as a force down input if the sensing level reaches a third sensing level.

For example, from a typical home screen, if a force input is applied on the decision key 212 such that the sensing level reaches the second sensing level, then a recommended list can be presented, whereas if a force input is applied on the decision key 212 such that the sensing level reaches the third sensing level, then a VOD list can be shown.

In this case, by entering a force input on the decision key 212 with the sensing level at the second sensing level, a user can have the recommended programs shown, and by subsequently entering a force input on the decision key 212 such that the sensing level is at the third sensing level, the user can move back to the home screen. By continuing to enter a force input on the decision key 212 such that the sensing level is kept at the third level, the user can have the VOD list shown, and if the user enters a force input such that the sensing level is at the second sensing level, the user can return to the home screen.

The image processing terminal 102 may be an apparatus that performs a particular operation according to the control signal transmitted from the remote control 100 and may execute a different operation or a different screen according to whether a normal input or a force input was entered.

The server 104 may be connected with the image processing terminal 102 and can provide software to the image processing terminal 102 or receive information regarding force inputs from the image processing terminal 102 to create user profiles.

According to an embodiment of the invention, the server 104 can create a user profile by analyzing the normal inputs and force inputs entered by a user during a certain period of time. Afterwards, the server 104 can detect the user profile corresponding to the user when a force input is entered, and based on the detected user profile, provide a customized service, such as a recommended list for example, to the user via the image processing terminal 102.

Also, the server 104 can analyze the coordinate value, i.e. the sensing level, of the key selected by the user, and in the event that the value of the sensing level does not directly match a preset sensing level but instead lies between the specified sensing levels, can perform a coordinate compensation procedure of assigning the sensing level to one of the specified levels.

That is, with the sensing level values already set for a normal input and a force input, if the sensing level value at the key selected by the user lies at the boundary between the normal input and the force input, the server 104 may recognize this as one of a normal input or a force input.

If the input is recognized as one of a normal input or a force input according to the coordinate compensation, then the result can be incorporated as a history of key selections made by the user when creating the user's profile information.

Incidentally, if force inputs can be divided into multiple sensing levels, the coordinate compensation above can entail determining the sensing level of the key selected by the user to be one of the multiple force input sensing levels.

Also, the server 104 can analyze the normal inputs and force inputs entered by the user during a certain period of time to perceive a service error.

For example, when a program transmission or a content replay is stopped, or when the screen suddenly freezes, users will generally press a particular key on the remote control with greater force.

Therefore, the number of force inputs made on a particular key of the remote control, the pressure applied, and the like, as received from the remote control can be monitored, and if the number of presses or the pressure applied is greater than usual, it can be recognized that an error has occurred during service, and a notification can be sent to a terminal of the operator in charge.

To be more specific, the pressure applied or area covered when entering a force input may be different for each user; for example, a first user may press a key with a first pressure when entering a force input, while a second user may press a key with a second pressure when entering a force input.

In this case, the server 104 can analyze the pressure or area of force inputs, i.e. the sensing levels, of an individual user for a certain period of time, and can thus determine the sensing level of a force input for the user.

When multiple users use the same remote control 100, the sensing level can be different for each user, and the server 104 can analyze such differences in sensing levels as well as the users' history of activity, such as viewing information, etc., when force inputs are made, to thereby create user profiles. Afterwards, when a force input is entered, the server 104 can detect a user profile corresponding to the force input and can provide customized services corresponding to the detected user profile.

Here, the history of activity can include at least one of a program viewing history, a login history, or an application access history of the user using the image processing terminal.

Whereas creating a user profile according to the related art may first require a user authentication process, the system according to an embodiment of the invention can create a user profile without an authentication process by using data in regard to force inputs or force inputs and normal inputs.

Of course, since there is no authentication process, the user's name may not necessarily be identified. However, the system can still provide customized services corresponding to the user that has entered a force input.

In short, the remote control 100 of the present embodiment may sense the touch area, touch pressure, etc., of the touch means to determine the sensing level and then transmit a control signal to the image processing terminal 102 with the information regarding the determined sensing level included in the control signal, at which the image processing terminal 102 can execute a different operation or screen according to the sensing level.

Also, user profiles can be created by analyzing the users' force inputs and activity history of the user's activity for a certain period of time. Then, when a force input is entered, customized services can be provided based on the user profile corresponding to the entered force input.

Of course, when creating a user profile, it is possible to consider normal inputs as well as force inputs.

The sensing level obtained from the pressing of a key can be determined if the pressure or area continues for a preset duration of time or longer.

Also, if the level corresponding to the touch of the touch means does not directly match a preset sensing level but lies in-between particular levels, the level can be determined to be one of the particular levels.

More specifically, the level can be determined as the upper or as the lower of the particular levels.

Furthermore, the media system can consider not only force inputs but also gestures.

Here, a gesture refers to the operation in which the touch means makes a touch over a certain length or more, as illustrated in drawing FIG. 2B. A particular operation can be performed in accordance with the gesture.

For example, while the image of a particular object in a program guide is being shown in a PIP according to a force input, a particular gesture can be used to move the PIP in a particular direction, expand the PIP to the full screen, or return the PIP to the position before the force input was made. Such gesture can entail touching a multiple number of keys.

Whereas the descriptions above referred to expressing the coordinates as 3-dimensional coordinates (x, y, z), it is also possible to express the coordinates as 4-dimensional coordinates (x, y, z, t) such as by designating separate coordinates for the area and the pressure. That is, more than one parameter can be related to the sensing level.

The conventional remote control only allows for normal inputs on the keys, so that only one function can be matched with each key.

Thus, a considerably large number of keys may have to be placed on the remote control, resulting in a complicated structure for the remote control and increased inconvenience on the part of the user.

In contrast, the remote control 100 according to an embodiment of the invention can provide not only normal inputs but also force inputs, so that multiple functions can be matched with each key.

Therefore, the various functions of the image processing terminal 102 can be executed with a minimal number of keys on the remote control 100, allowing a simpler structure for the remote control 100 and more convenient use for the user.

The operations of such a media system are described below, illustrating various possible features.

According to a first possible feature, if a particular key on the remote control 100 is selected with a different sensing level, the image processing terminal 102 can execute a different function according to the sensing level.

Also, a force input entered on a navigation key, such as the UP key for instance, can be made to function as a function key or a decision key.

For example, when a force input is entered on a navigation key, the force input can function as a home key or an ESC key.

Of course, a force input entered on a function key can similarly serve as a navigation key or a decision key, while a force input entered on a decision key can serve as a navigation key or a function key.

According to a second possible feature, if a particular key on the remote control 100 is selected with a different sensing level, the image processing terminal 102 can display a different screen.

That is, if the remote control 100 transmits a first control signal corresponding to a first sensing level to the image processing terminal 102, then the image processing terminal 102 can display a first screen in which a first UI (user interface) is shown as an object, whereas if the remote control 100 transmits a second control signal corresponding to a second sensing level to the image processing terminal 102, then the image processing terminal 102 can display a second screen having a second UI that is different from the first UI.

According to a third possible feature, if a particular key on the remote control 100 is selected with a different sensing level, the image processing terminal 102 can execute a different operation for the same function depending on the sensing level.

For example, if the remote control 100 transmits a first control signal corresponding to a first sensing level to the image processing terminal 102, then the image processing terminal 102 can move the cursor over a program guide at a first speed, whereas if the remote control 100 transmits a second control signal corresponding to a second sensing level to the image processing terminal 102, then the image processing terminal 102 can move the cursor over the program guide at a second speed that is different from the first speed.

Obviously, various examples can be derived; some are described below, but some are not.

According to a fourth possible feature, if a particular key on the remote control 100 is selected with a different sensing level, the image processing terminal 102 can implement a different object depending on the sensing level.

For example, if the remote control 100 transmits a first control signal corresponding to a first sensing level to the image processing terminal 102, then the image processing terminal 102 can display an object related to a program guide, whereas if the remote control 100 transmits a second control signal corresponding to a second sensing level to the image processing terminal 102, then the image processing terminal 102 can display an object related to the user's preferred programs.

According to a fifth possible feature, even if the same force input is entered on the same key of the remote control 100, the image processing terminal 102 can perform a different operation depending on the mode or program set at the image processing terminal 102.

For example, if a force input is entered on the decision key 212 while the image processing terminal 102 is displaying several program lists, then the arrangement of the program lists can be changed, whereas if a force input is entered on the decision key 212 while the image processing terminal 102 is displaying VOD lists offered by a provider, then recommended VOD lists suited to the user can be displayed.

According to a sixth possible feature, the server 104 can analyze the history of activity during a preset period of time, such as regards force inputs entered and viewing history, etc., to create user profiles, so that later when a new force input is entered, customized services can be provided based on the user profile matching the force input. Of course, it is possible to consider not only force inputs but also normal inputs when creating user profiles.

A description is provided below of various embodiments related to various operations performed according to sensing level.

First, a definition of a sensing level is provided.

Figure 4A:
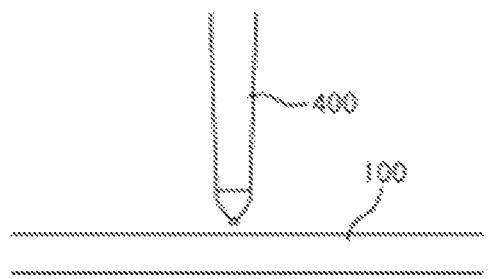
FIG. 4A to FIG. 4C illustrate touch inputs that can be made with a touch means according to an embodiment of the invention.
Figure 4B:
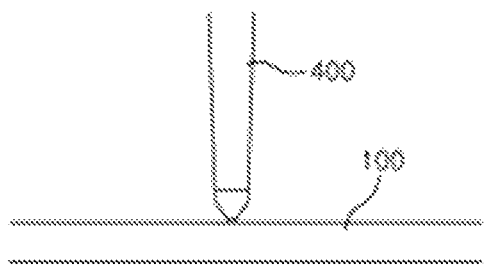
Figure 4C:
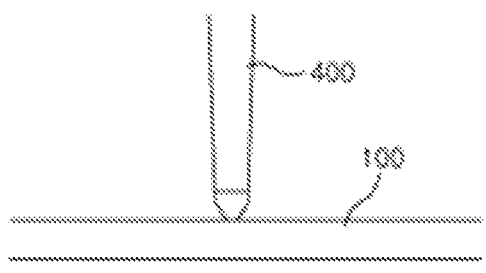

FIG. 4A to FIG. 4C illustrate touch inputs that can be made with a touch means according to an embodiment of the invention.

The settings for the individual keys of the remote control 100 can include a first level for sensing the approaching near of the touch means 400, as illustrated in drawing FIG. 4A, a second level for sensing the touch means 400 making a touch with a value lower than a preset sensing level (a normal input), as illustrated in drawing FIG. 4B, and a third level for sensing the touch means 400 making a touch with a value greater than or equal to the preset sensing level (a force input), as illustrated in drawing FIG. 4C.

That is, the individual keys of the remote control 100 can be set to have multiple sensing levels. Of course, the sensing levels can be set for all of the keys, but in some cases, some of the keys can be set to have only one sensing level. Here, the sensing level can be determined based on a change in capacitance.

The sensing level can be determined when the touch means 400 presses a key for a preset duration of time or longer.

Next, a description is provided below of various embodiments related to various operations performed according to a force input.

FIG. 5 is a flowchart conceptually illustrating the operations of a media system according to an embodiment of the invention, while FIG. 6 to FIG. 10 illustrate embodiments related to the operations of FIG. 5.

Referring to FIG. 5, according to a touch made by the touch means, the remote control 100 may sense a first sensing level (S500).

According to an embodiment of the invention, the remote control 100 can sense a sensing level using a capacitance-based method. The sensing level can be determined by at least one of an area or a pressure by which a particular key is pressed.

Then, the remote control 100 may express the information for the first sensing level resulting from the selection of a particular key as the coordinate (x, y, z1), and may transmit a first signal, with the coordinate (x, y, z1) included, to the image processing terminal 102.

In this case, the image processing terminal 102 can execute a first operation in accordance with the first control signal (S502).

Continuing on, the user can press the particular key using a touch means with a greater pressure or over a larger area, and the remote control 100 may sense a second sensing level in accordance with such touch made by the touch means (S504).

Then, the remote control 100 may express the information for the second sensing level resulting from the selection of the particular key as the coordinate (x, y, z2), and may transmit a second signal, with the coordinate (x, y, z2) included, to the image processing terminal 102.

In this case, the image processing terminal 102 can execute a second operation in accordance with the second control signal (S506).

Figure 6:
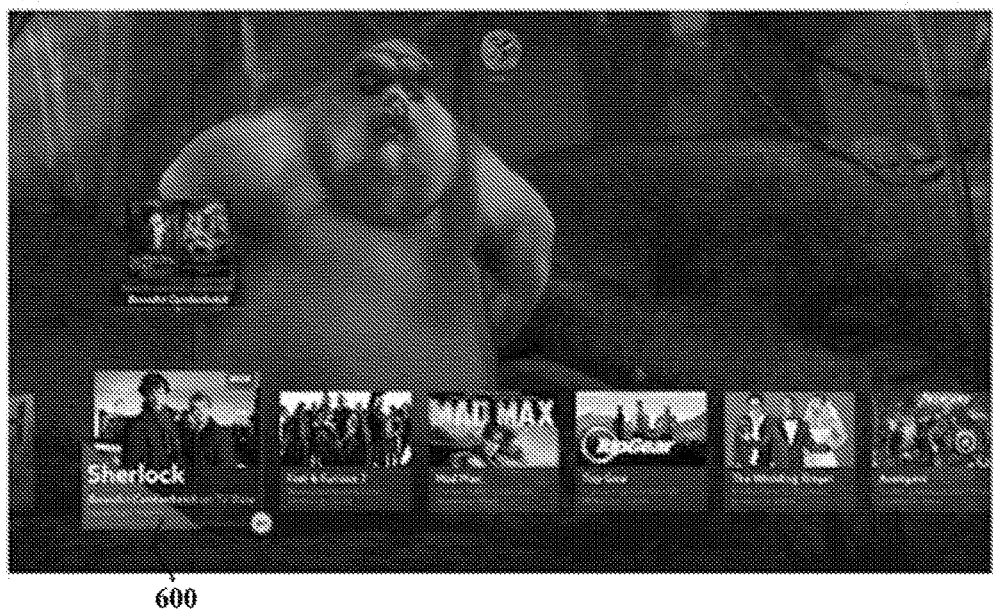
FIG. 6 to FIG. 10 illustrate embodiments related to the operations of FIG. 5.

Consider a first embodiment related to this type of operation. When the remote control 100 transmits the first control signal, which includes information regarding the first sensing level, to the image processing terminal 102, the image processing terminal 102 can display a screen in which a channel list (program guide) that includes at least one channel object 600 is shown, as illustrated in FIG. 6.

Figure 7:

Then, when the remote control 100 transmits the second control signal, which includes information regarding the second sensing level, to the image processing terminal 102, the image processing terminal 102 can display a screen in which a greater number of channel objects 600 are shown, as illustrated in FIG. 7.

That is, the image processing terminal 102 can increase or decrease the number of objects according to the sensing level from the remote control 100.

While the above uses a channel list as an example, the above operation can be applied to various other types of objects, such as a VOD list, a preferred program list, etc.

Considering a second embodiment, when the remote control 100 transmits the first control signal that includes information regarding the first sensing level to the image processing terminal 102, the image processing terminal 102 can display a screen in which the channel objects 600 are disposed in a first arrangement, as illustrated in FIG. 7.

Figure 8:
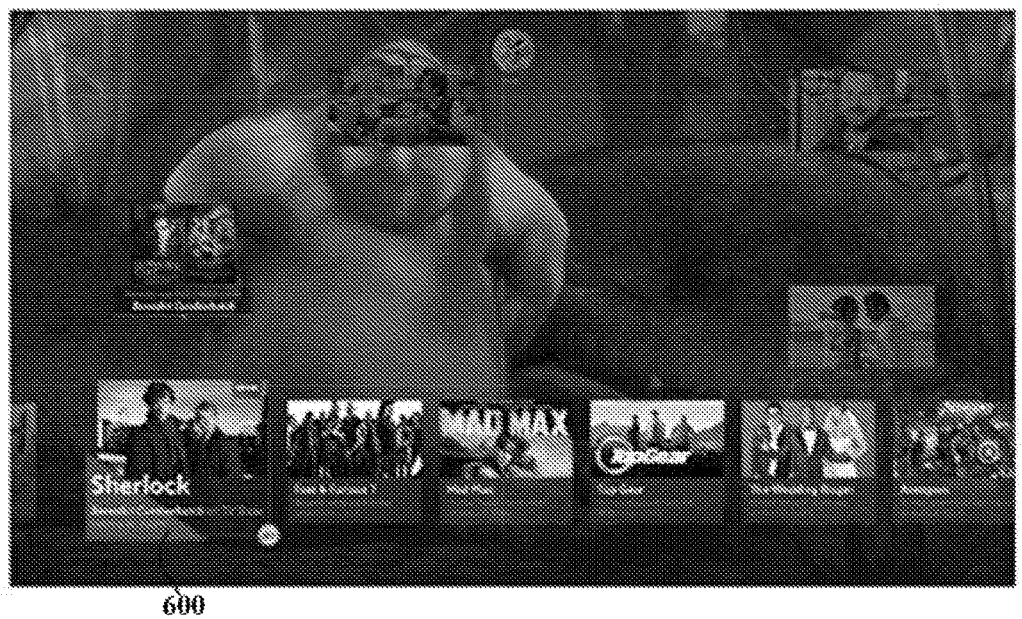

Then, when the remote control 100 transmits the second control signal that includes information regarding the second sensing level to the image processing terminal 102, the image processing terminal 102 can display a screen in which the channel objects 600 are disposed in a second arrangement that is different from the first arrangement, as illustrated in FIG. 8.

Here, a change in arrangement can include any one or more of a change in the position of an object 600, an adding or removing of an object 600, a change in the size of an object 600, and the like.

Figure 9:
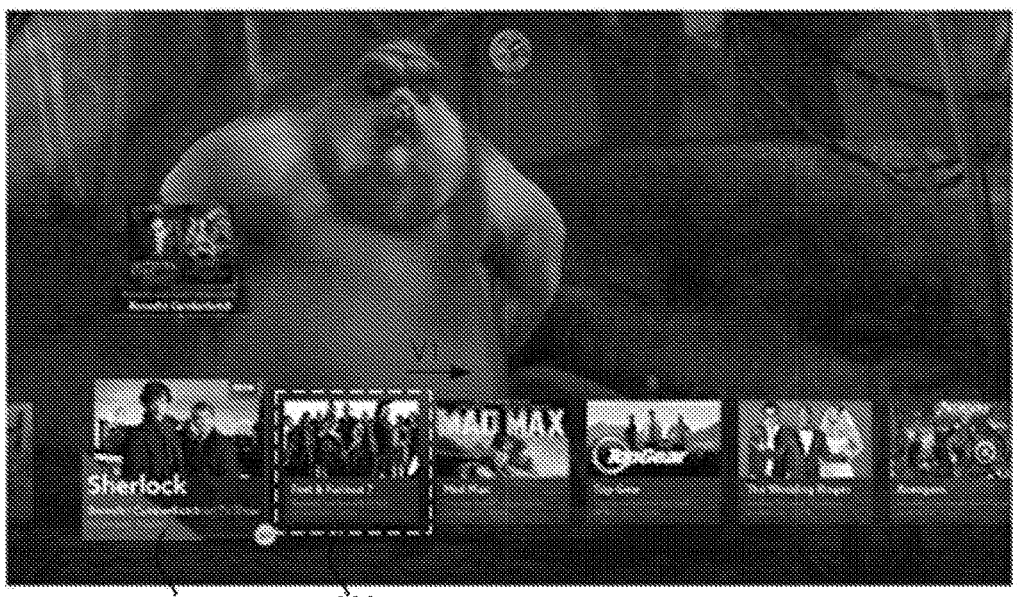

Considering a third embodiment, when the remote control 100 transmits a first control signal that includes information regarding a first sensing level entered on a rightward directional key, for instance, to the image processing terminal 102, the image processing terminal 102 can display the objects 600 as in FIG. 9, and while a selection object 900 is positioned over one of the objects 600, can move the selection object 900 in a rightward direction at a first speed v1.

Figure 10:
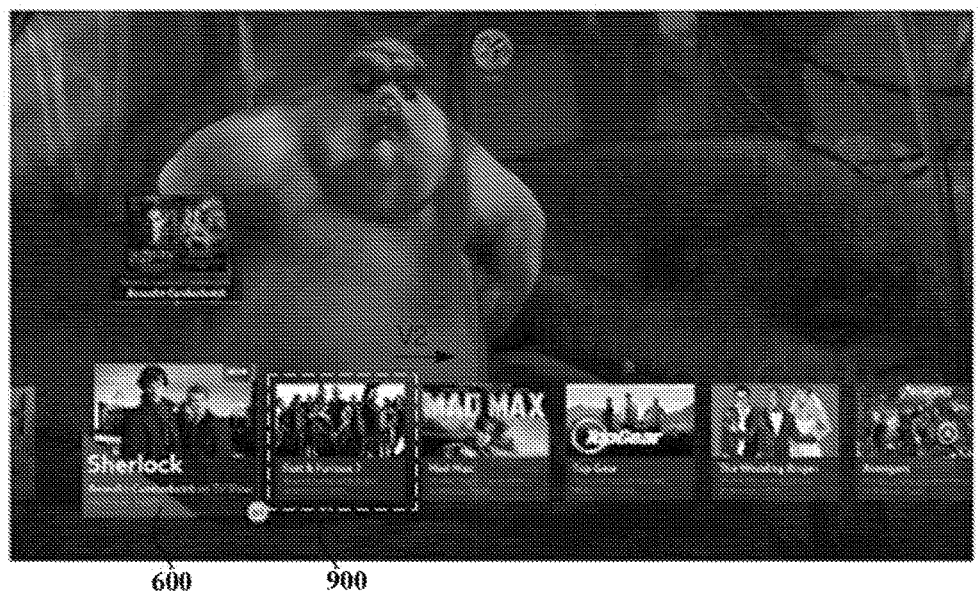

Then, when the remote control 100 transmits a second control signal that includes information regarding a second sensing level entered on the rightward directional key to the image processing terminal 102, the image processing terminal 102 can move the selection object 900 in a rightward direction at a second speed v2, as illustrated in FIG. 10.

Alternatively, the image processing terminal 102 can move the selection object 900 to skip forward. In other words, the movement speed of the object 900 can be made to vary according to the sensing level.

Furthermore, it is possible to vary the play speed of a VOD, etc., instead of the movement speed, according to the sensing level. Such changes in movement speed and play speed can be associated mainly with navigation keys, which are related to directional keys.

As described with respect to FIG. 5 through FIG. 10, a different sensing level for a particular key of a remote control 100 can trigger a different function or operation of the image processing terminal.

In addition to the examples above, it is also possible to execute an operation such as changing the size or shape of an object, previewing a content, returning to the home screen, altering modes, etc., according to the sensing level.

Figure 11:
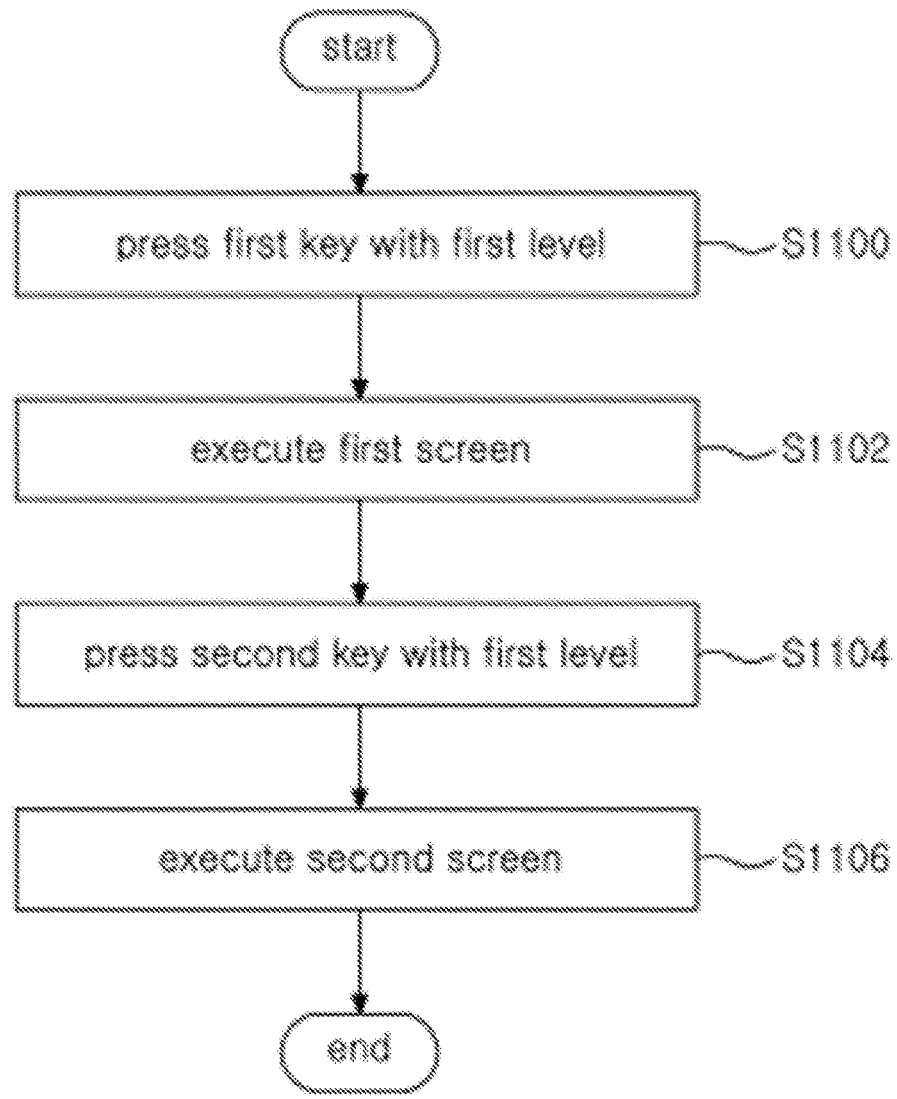
FIG. 11 is a flowchart conceptually illustrating the operations of a media system according to an embodiment of the invention.
Figure 12A:
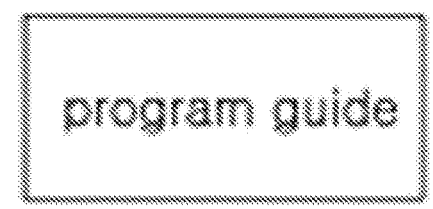
FIG. 12A and FIG. 12B illustrate embodiments related to the operations of FIG. 11.
Figure 12B:
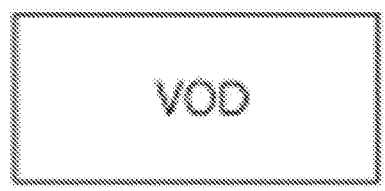

FIG. 11 is a flowchart conceptually illustrating the operations of a media system according to an embodiment of the invention, and FIG. 12A and FIG. 12B illustrate embodiments related to the operations of FIG. 11.

Referring to 11, according to a touch made by the touch means, the remote control 100 may sense a first sensing level (S1100).

Then, the remote control 100 may express the information for the first sensing level resulting from the selection of a particular key as the coordinate (x, y, z1), and may transmit a first signal, with the coordinate (x, y, z1) included, to the image processing terminal 102.

In this case, the image processing terminal 102 can execute a first screen in accordance with the first control signal (S1102).

Continuing on, the user can press the particular key using a touch means with a greater pressure or over a larger area, and the remote control 100 may sense a second sensing level in accordance with such touch made by the touch means (S1104).

Then, the remote control 100 may express the information for the second sensing level resulting from the selection of the particular key as the coordinate (x, y, z2), and may transmit a second signal, with the coordinate (x, y, z2) included, to the image processing terminal 102.

In this case, the image processing terminal 102 can execute a second screen in accordance with the second control signal (S1106).

In short, with the media system according to this embodiment, the screen processed by the image processing terminal 102 can be implemented differently according to a change in sensing level from the remote control 100.

According to another embodiment, the media system can change the application processed by the image processing terminal 102 according to the change in sensing level from the remote control 100.

Consider an embodiment related to this type of operation. When the remote control 100 transmits the first control signal, which includes information regarding the first sensing level, to the image processing terminal 102, the image processing terminal 102 can display a first screen in which a program guide is shown, as illustrated in drawing FIG. 12A.

Then, when the remote control 100 transmits the second control signal, which includes information regarding the second sensing level, to the image processing terminal 102, the image processing terminal 102 can display a second screen in which a VOD list is shown, as illustrated in drawing FIG. 12B.

That is, the image processing terminal 102 can change the screen or application depending on the sensing level of the remote control 100.

Figure 13:
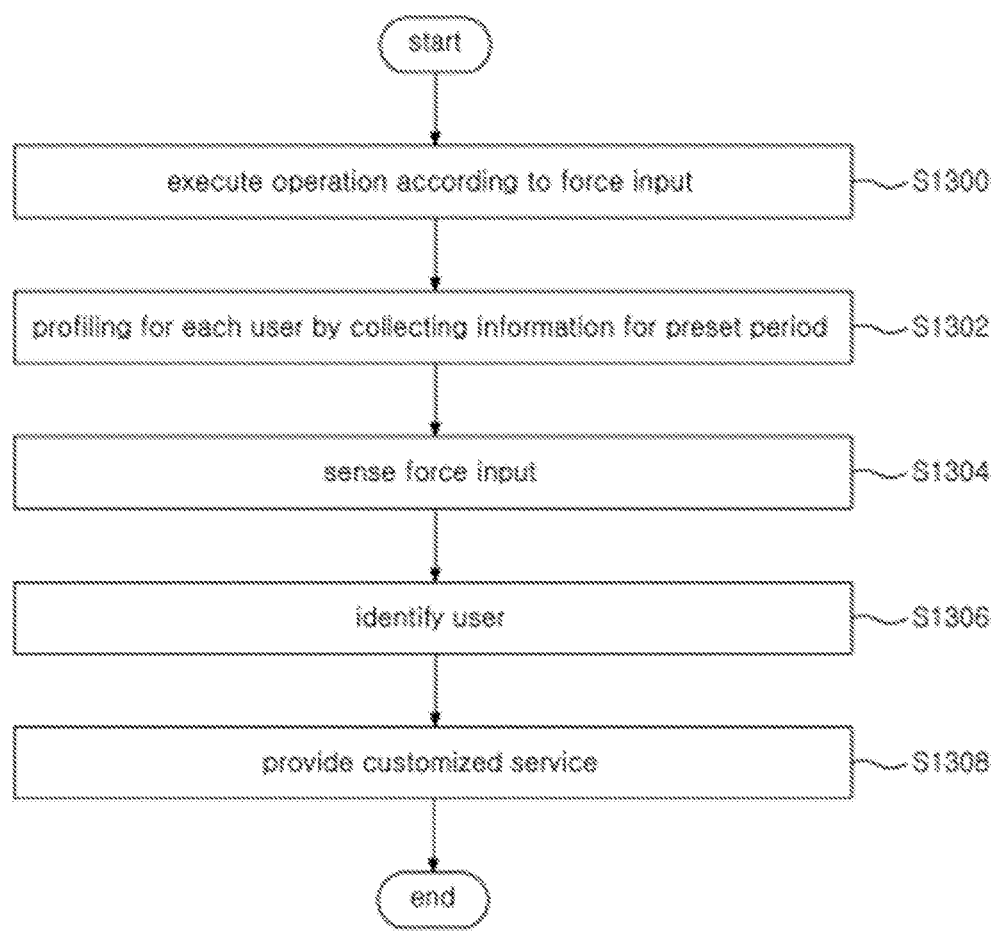
FIG. 13 is a flowchart illustrating the procedures for a user profiling and customization service according to an embodiment of the invention.
Figure 14:
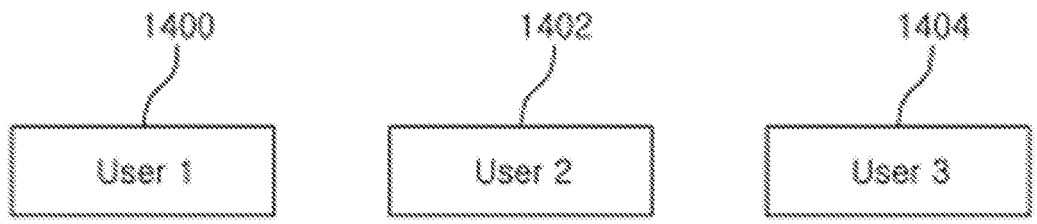
FIG. 14 illustrates user profiles according to an embodiment of the invention.

FIG. 13 is a flowchart illustrating the procedures for a user profiling and customization service according to an embodiment of the invention, and FIG. 14 illustrates user profiles according to an embodiment of the invention.

Referring to FIG. 13, when the user provides a force input into the remote control 100, the image processing terminal 102 may execute an operation in accordance with the provided force input (S1300).

The server 104 may create a profile for each user (S1302) by collecting information regarding force inputs, their related operations, activity history, etc., from the image processing terminal 102 or the remote control 100 for a preset period of time. Here, it is not necessary to include a user authentication procedure.

For example, if it is determined, based on the results of analyzing force inputs performed by the server 104 for a preset period of time, that a first user enters force inputs with a first sensing level, a second user enters force inputs with a second sensing level, and a third user enters force inputs with a third sensing level, then the server 104 can create user profiles 1400, 1402, 1404, as illustrated in FIG. 14.

Here, the user profiles can be created based on average pressures or areas of the force inputs entered during the preset period of time.

After such user profiles are created, when a particular user enters a force input into the remote control 100, the server 104 can detect a user profile corresponding to the entered force input. That is, the user can be identified (S1306).

For example, if a force input is entered with a second sensing level, then the server 104 can match the user profile 1402 corresponding to User 2 with the force input.

Then, the server 104 can provide the user with customized services corresponding to the user profile detected above through the image processing terminal 102 (S1308).

For example, when the force input is entered, the server 104 can provide the user with a recommended program list that corresponds to the user profile matching the second user.

Steps S1306 and S1308 can also be performed by the image processing terminal 102 instead of the server 104.

In short, the media system according to an embodiment of the invention may create user profiles by analyzing the force inputs and activity history of a preset period of time, and when a force input is entered, may provide a customized service corresponding to the created user profile.

Since the embodiment described above does not entail a separate authentication procedure, the exact name of the user cannot be set for a user profile, and a name arbitrarily supplied by a program can be set for the user profile.

A description is provided below of a process for configuring user settings, such as for changing the user name, etc.

Figure 15:
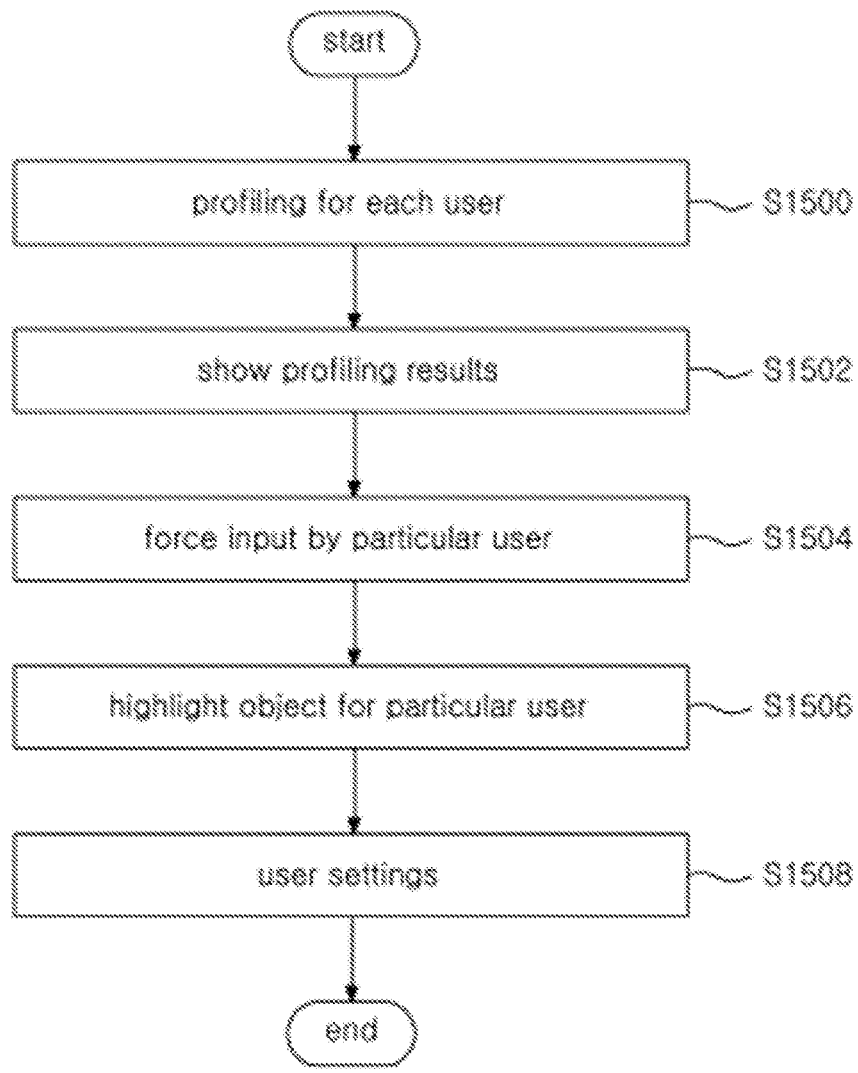
FIG. 15 is a flowchart illustrating the procedures for changing a user profile according to an embodiment of the invention.
Figure 16:
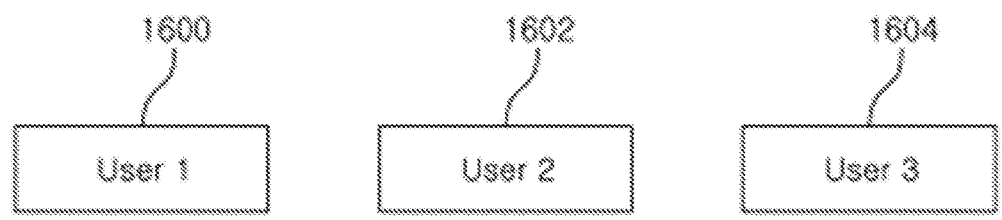
FIG. 16, FIG. 17, and FIG. 18 illustrate an example of the changing of a user profile shown in FIG. 15.
Figure 17:
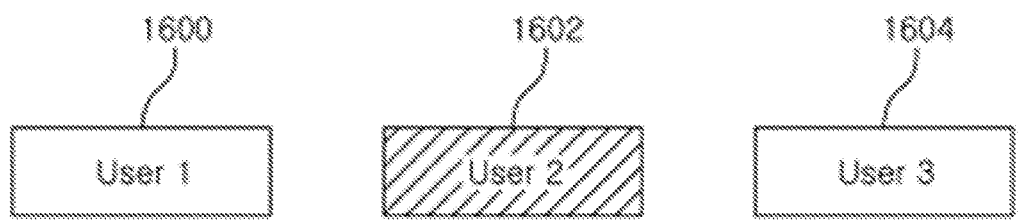
Figure 18:
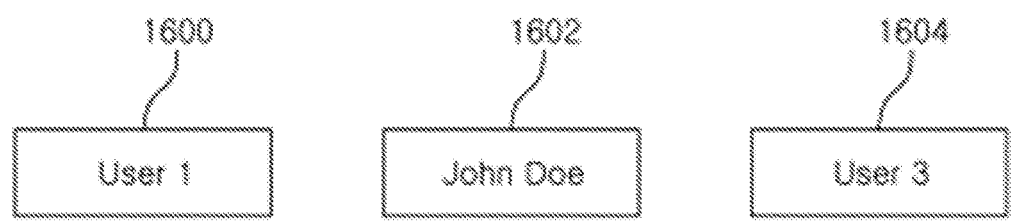

FIG. 15 is a flowchart illustrating the procedures for changing a user profile according to an embodiment of the invention, and FIG. 16 through FIG. 18 illustrate an example of the changing of a user profile shown in FIG. 15.

Referring to FIG. 15, the server 104 may create a profile for each user (S1500) by analyzing the users' force inputs and activity history for a preset period of time, and may show the user profiles through the image processing terminal 102 or a display connected to the image processing terminal 102.

For example, the server 104 can create and show user profiles 1600, 1602, 1604 recorded as User 1, User 2, and User 3, as illustrated in FIG. 16.

Then, when a particular user enters a force input into the remote control (S1504), the server 104 can highlight an object, i.e. user profile, corresponding to the entered force input (S1506).

For example, if the force input corresponds to user profile 1602, then the image processing terminal 102 under the request of the server 104 can highlight user profile 1602 (S1506), as illustrated in FIG. 17.

Thus, the user who has entered the force input may see that his/her profile is user profile 1602.

Continuing on, the user can change at least one setting of the highlighted user profile (S1508). For example, the user can change the name of the highlighted user profile 1602 to "John Doe", as illustrated in FIG. 18.

In short, the media system according to an embodiment of the invention can create user profiles by analyzing force inputs and activity history, and can also change the user profiles created thus.

Figure 19:
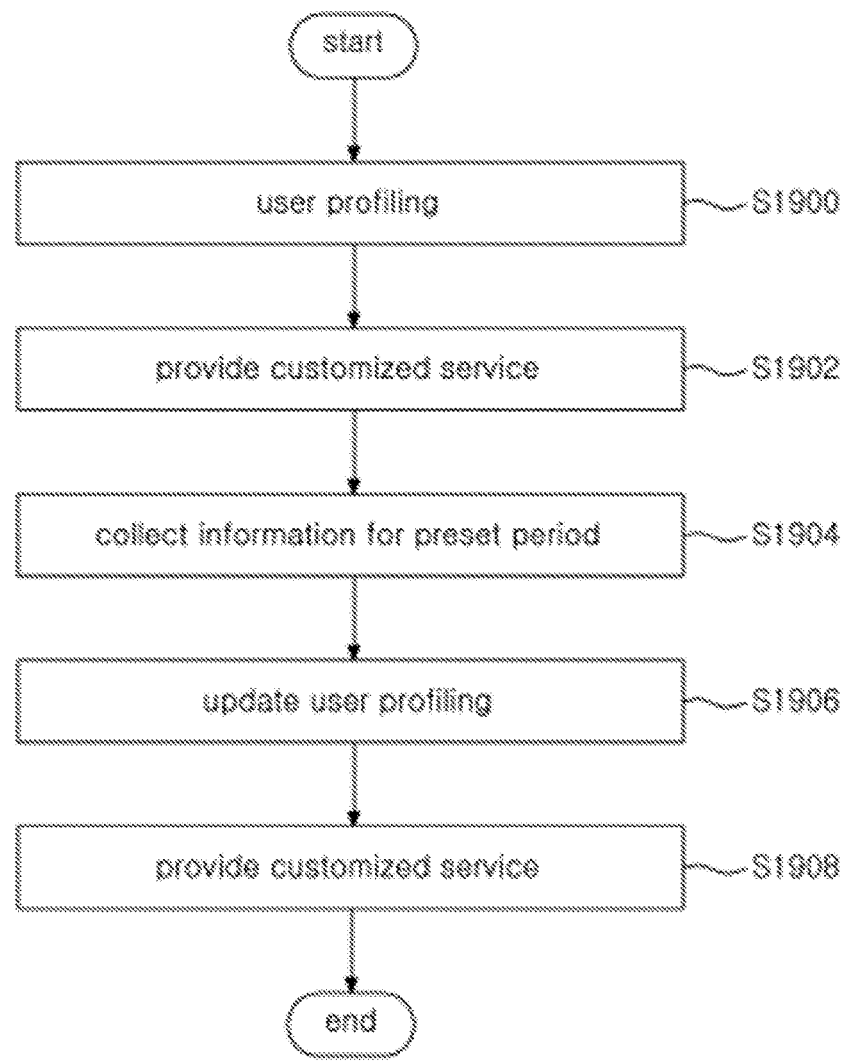
FIG. 19 is a flowchart illustrating the procedures for updating a user profile according to an embodiment of the invention.

FIG. 19 is a flowchart illustrating the procedures for updating a user profile according to an embodiment of the invention.

Referring to FIG. 19, the server 104 may generate a profile for each user by analyzing the users' force inputs, activity history, etc., entered during a preset period of time (S1900).

Then, when a force input by a particular user is entered, the server 104 may refer to the user profile corresponding to the force input to provide customized services (S1902).

Even after step S1900, the server 104 can continue to collect data (information) regarding the user's force inputs during a preset period of time or can collect information on the user's force inputs for a preset period of time after a software upgrade on the media system (S1904).

Continuing on, the server 104 may update the user profiles based on the collected information relating to force inputs (S1906) and may provide users with customized services based on the updated user profiles (S1908).

In short, the media system according to an embodiment of the invention can update or change the user profiles at regular intervals or at special occasions, to provide customized services based on the updated or changed user profiles.

Figure 20:
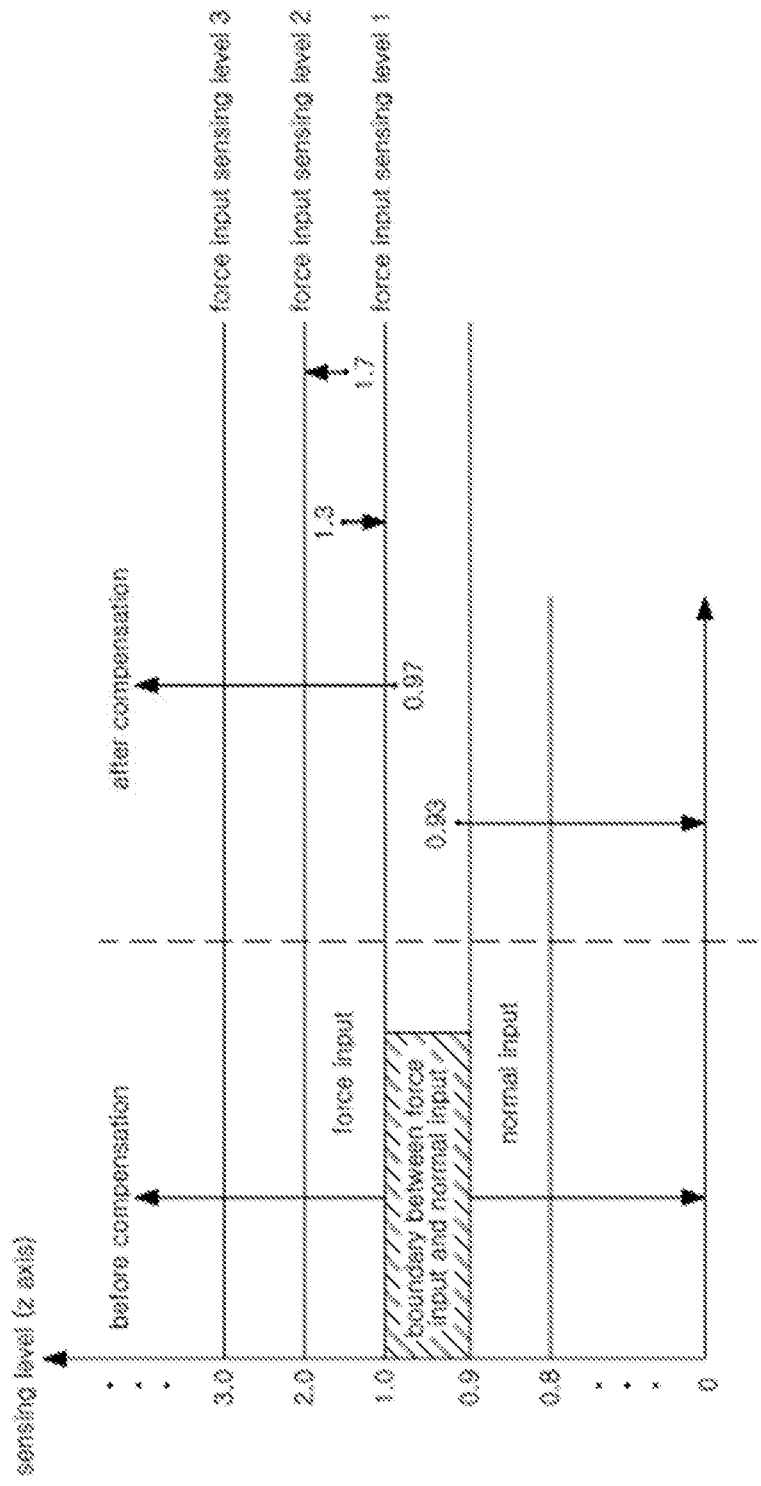
FIG. 20 illustrates coordinate compensation according to an embodiment of the invention.

FIG. 20 illustrates coordinate compensation according to an embodiment of the invention.

As described above, the server 104 can create a profile for each user by analyzing users' normal inputs and force inputs entered during a preset period of time, and when a key input by a particular user is entered, can reference the user profile corresponding to the sensing level of the inputted key, i.e. a normal input or force input, to provide customized services.

During this process, if the sensing level of the key inputted by the user does not directly match the preset sensing levels and lies in-between specified sensing levels, then coordinate compensation can be performed for compensating the sensing level to be one of the specified levels.

For example, as illustrated in FIG. 20, the boundary values for sensing levels between a normal input and a force input can be 0.9 and 1.0.

That is, a key input can be classified as a normal input if the z-axis value of its 3-dimensional coordinate is 0.9 or lower and can be classified as a force input if the z-axis value is 1.0 or higher.

However, if the z-axis value of a key input is "0.93", for example, and thus lies between the boundaries for the normal input and force input, then the server 104 can perform coordinate compensation such that the z-axis value of the key inputted by the user is compensated to be that of a normal input.

If the z-axis value of a key input is "0.97", for example, and thus lies between the boundaries for the normal input and force input, then the server 104 can perform coordinate compensation such that the z-axis value of the key inputted by the user is compensated to be that of a force input.

The coordinate compensation method can be applied in the same manner in cases where force inputs are divided into multiple sensing levels.

That is, in cases where the force inputs can be divided into multiple sensing levels as illustrated in FIG. 20, if the z-axis value of a key input is "1.3", for example, and thus lies between the boundaries for the a first sensing level and a second sensing level, then the server 104 can perform coordinate compensation such that the z-axis value of the key inputted by the user is compensated to be the first sensing level from among the multiple sensing levels for force inputs.

Also, if the z-axis value of a key input is "1.7", for example, and thus lies between the boundaries for the a first sensing level and a second sensing level, then the server 104 can perform coordinate compensation such that the z-axis value of the key inputted by the user is compensated to be the second sensing level from among the multiple sensing levels for force inputs.

As described above, in cases where the sensing level of a key input entered by the user does not directly match one of the preset sensing levels and lies in-between the specified sensing levels, then the value of the sensing level can be rounded off to the nearest specified level.

However, certain embodiments may not necessarily use the method of rounding off the value of the sensing level. In the embodiment described above, it is also possible to compensate the values such that values lower than 1.0 are all considered normal inputs and values higher than or equal to 1.0 are all considered force inputs.

The normal input or force input determined by coordinate compensation as described above can be incorporated in the history of keys selected by the user when creating the user profile information.

Of course, the server 104 can also create user profile information by using the history of normal inputs or force inputs for which the coordinate compensation described above has not been applied.

According to another embodiment, if the sensing level for a user's input lies in-between preset sensing levels, a selection window can be displayed on the remote control 100 or on the image processing terminal 102 to allow the user to select one of the sensing levels, instead of directly compensating the sensing level to one of the preset sensing levels. In this case, the window can be accompanied by a description of the functions associated with the sensing levels available for selection by the user.

Figure 21:
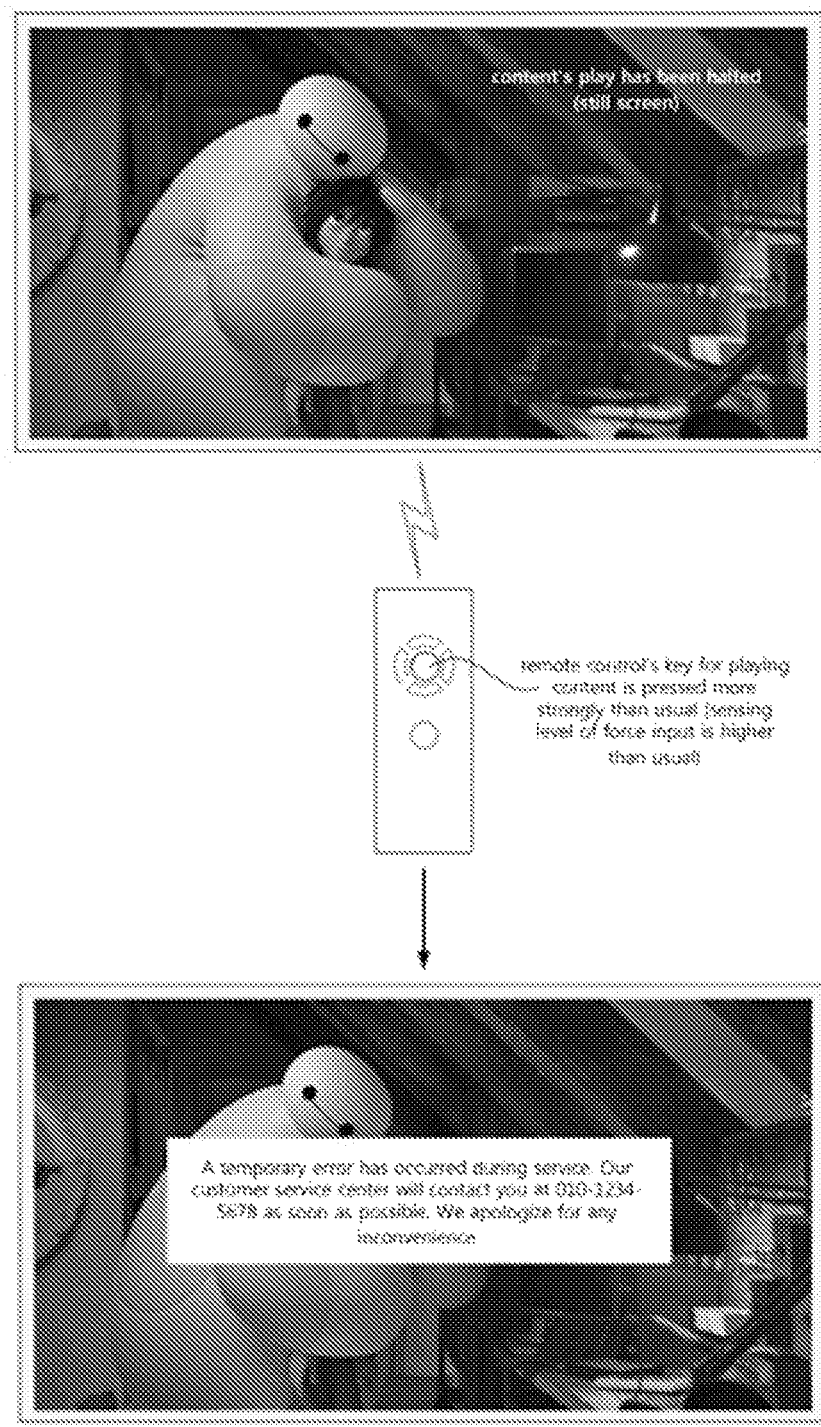
FIG. 21 illustrates service error recognition according to an embodiment of the invention.

FIG. 21 illustrates service error recognition according to an embodiment of the invention.

When using a service such as a digital broadcast, IPTV, etc., a user may generally use a constant pressure for pressing a key of the remote control to execute the same operation or screen.

Thus, by analyzing the history regarding the sensing levels for keys inputted by each user, it is possible to identify the key selected by a user until a particular menu item is executed, and the sensing level applied for the selected key.

Incidentally, the results of analyzing the history regarding sensing levels for keys inputted by each user can be included in the user profile information.

For example, suppose that the keys of the remote control selected by a particular user until a menu item A is executed follow the pattern of 'home key→right directional key→upward directional key→downward directional key→OK key' and that the sensing level for each key are: 'home key (normal input, z-coordinate value average 0.8)→right directional key (normal input, z-coordinate value average 0.8) →upward directional key (force input, z-coordinate value average 1.2)→downward directional key (force input, z-coordinate value average 1.2)→OK key (normal input, z-coordinate value average 0.8)'.

At the 'upward directional key (force input, z-coordinate value average 1.2)' during an input of the above pattern, if the 'upward directional key' is inputted repeatedly a particular number of times or more, and if the value of the sensing level inputted thus is also greater than the average of 1.2, being 2.0 for instance, then the image processing terminal 102 can determine that an error has occurred in providing the service corresponding to the upward directional key (force input) of the user's key selection pattern.

This is because, whereas the key of the remote control is generally pressed with a constant pressure when the same operation or screen is executed, the key would be pressed more strongly than usual if a problem arises during an operation related to the key.

Referring to FIG. 21 to consider another embodiment, if the playing of a content is halted mid-viewing, the user would press the key of the remote control 100 related to the playing of the content more strongly and with a number of repetitions.

The image processing terminal 102 can recognize that the sensing level for the key of the remote control 100 related to the playing of the content has increased to a higher level than usual and that the key is being pressed repeatedly, and can check the network status and determine whether or not an error has occurred in service. The image processing terminal 102 can also perform a self-examination to determine whether or not the cause of the error is within the image processing terminal 102 itself.

Afterwards, the image processing terminal 102 can output an info message concerning the determined error on the screen, as illustrated in FIG. 21, and can transmit information on the error to the service administrator's terminal (not shown), the service management server (not shown), or the server 104, etc., to allow a prompt resolution of the error.

Here, the image processing terminal 102 can concurrently transmit its identifier (apparatus ID) or customer identifier, etc., enabling the service operator to identify the customer's contacts and address, etc., by using the apparatus ID or customer identifier received from the image processing terminal 102, and call the customer directly or visit the address to resolve the error.

Thus, an embodiment of the invention can minimize inconvenience on the part of the customer in the event of an error, allow a quick resolution of the error, and improve the service provider's customer relations.

Moreover, the image processing terminal 102 can store a manual of responses to possible errors, and can show a solution to the error on the screen (e.g. 'Please try turning the power off and turning it back on;' 'temporary error has occurred, please contact our customer service center at 1500-xxxx.')

Of course, it is also possible to receive the solution to the error from the service administrator's terminal (not shown), the service management server (not shown), or the server 104 and display it on the screen.

Figure 22:
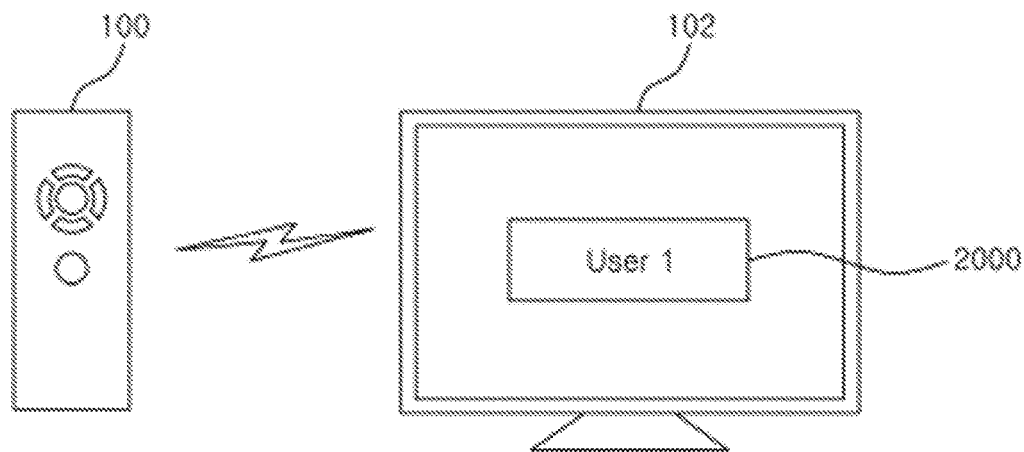
FIG. 22 illustrates the operation of a media system according to another embodiment of the invention.

FIG. 22 illustrates the operation of a media system according to another embodiment of the invention.

If the sensing level of an input provided to the remote control 100 corresponds to a normal input, there may be no related object be displayed on the image processing terminal 102, but if the sensing level of an input provided to the remote control 100 corresponds to a force input, a force input notification object 2000 can be displayed on the image processing terminal 102 that informs the user that a force input has been entered. Thus, the user can discern whether a normal input or a force input was entered by watching only the image processing terminal 102, without having to look at the remote control 100. Here, the force input notification object 2000 can have any of a variety of shapes, such as quadrilateral shapes, circular shapes, etc.

According to an embodiment of the invention, information related to the user profile, such as the user name for instance, can also be shown on the force input notification object 2000.

In short, to show that a force input was entered, a force input notification object 2000 may be shown on the image processing terminal 102 or a display unit connected thereto. In showing that a force input is being entered, the remote control 100 can also provide a vibration or a sound alert when the force input is entered. That is, the remote control 100 can perform a haptic operation when a force input is entered.

Figure 23:
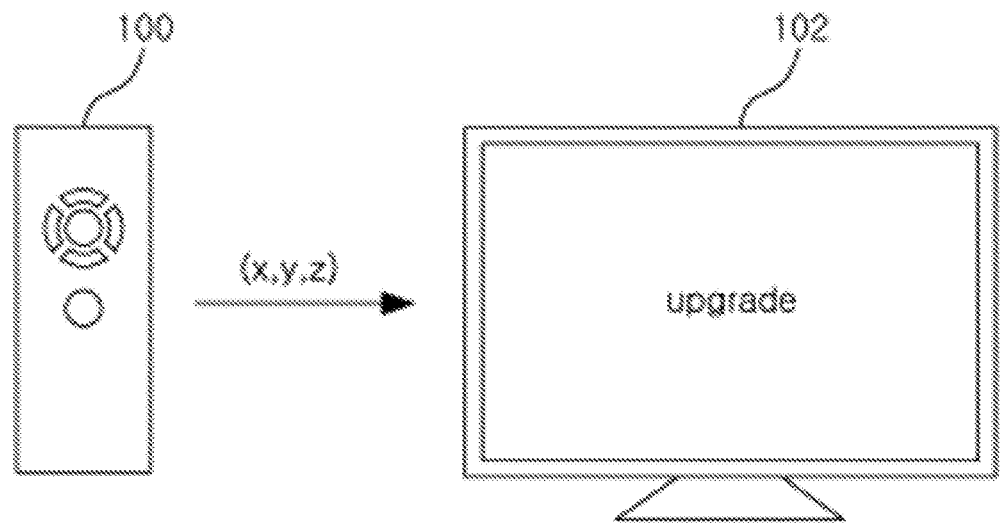
FIG. 23 illustrates an operation for upgrading a media system according to an embodiment of the invention.

FIG. 23 illustrates an operation for upgrading a media system according to an embodiment of the invention.

Referring to FIG. 23, during a software upgrade of the media system, the image processing terminal 102 can undergo an upgrade according to the upgrade software, whereas the remote control 100 does not necessary have to undergo a separate upgrade.

In this case, the remote control 100 can transmit only the control signal containing the coordinate (x, y, z) to the image processing terminal 102, and the image processing terminal 102 can perform an operation corresponding to the coordinate (x, y, z) according to the installed software.

Therefore, even if the remote control 100 transmits control signals that include the same coordinate (x, y, z) to the image processing terminal 102, the image processing terminal 102 can perform different operations.

In other words, since the remote control 100 does not require a separate remote control, the remote control 100 can have a simpler structure and does not have to provide complicated functions.

After an upgrade of the media system, the user profiles can be created again or can be updated by analyzing the force inputs entered during a certain period of time.

Figure 24:
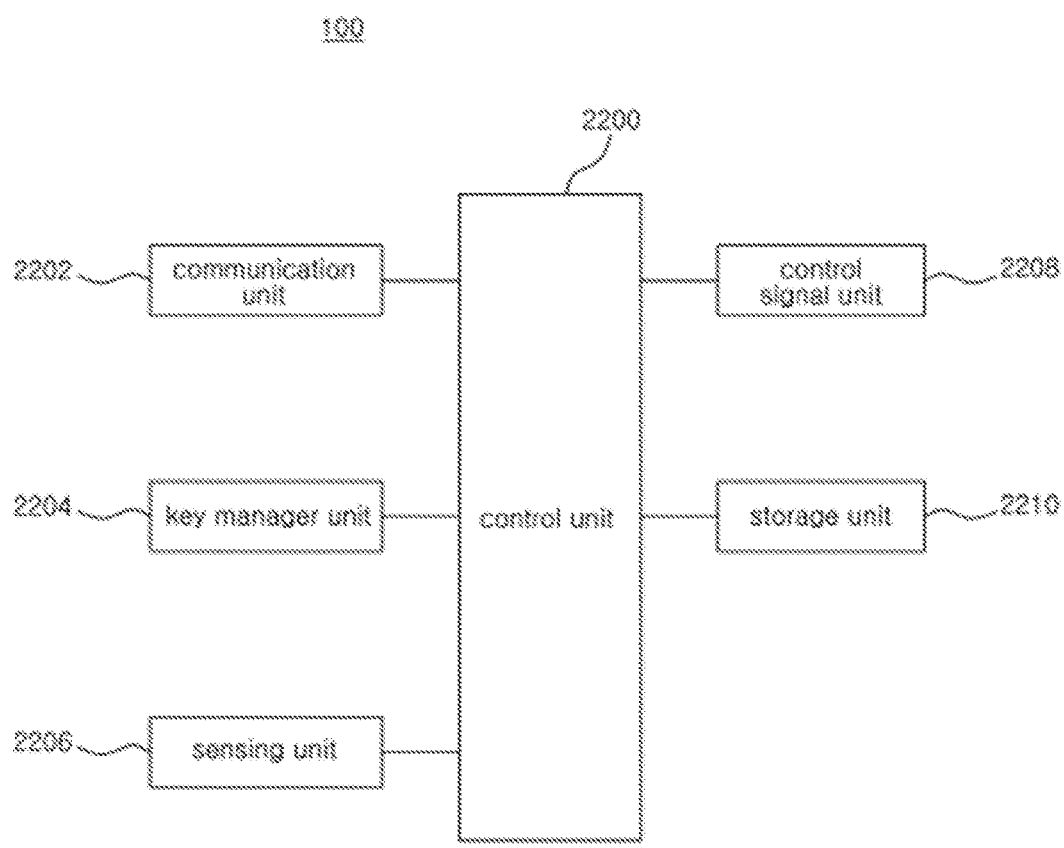
FIG. 24 is a block diagram illustrating a remote control according to an embodiment of the invention.

FIG. 24 is a block diagram illustrating a remote control according to an embodiment of the invention.

Referring to FIG. 24, a remote control 100 according to the present embodiment can include a control unit 2200, a communication unit 2202, a key manager unit 2204, a sensing unit 2206, a control signal unit 2208, and a storage unit 2210.

The communication unit 2202 may serve as a path of connection to the image processing terminal 102 or the server 104 and can employ a wired or a wireless method of communication.

The key manager unit 2204 may manage the navigation keys, decision key, function keys, etc., and in cases where the keys are implemented by software means, can configure the composition and arrangement of the keys differently according to the users' requests, etc.

The sensing unit 2206 may serve to sense normal inputs and force inputs.

The control signal unit 2208 may generate a control signal having coordinate information regarding the user's key input, and may transmit the control signal thus generated to the image processing terminal 102.

The storage unit 2210 may store various data, such as control signals, programs, etc.

The control unit 2200 may control the overall operations of the components of the remote control 100.

Figure 25:
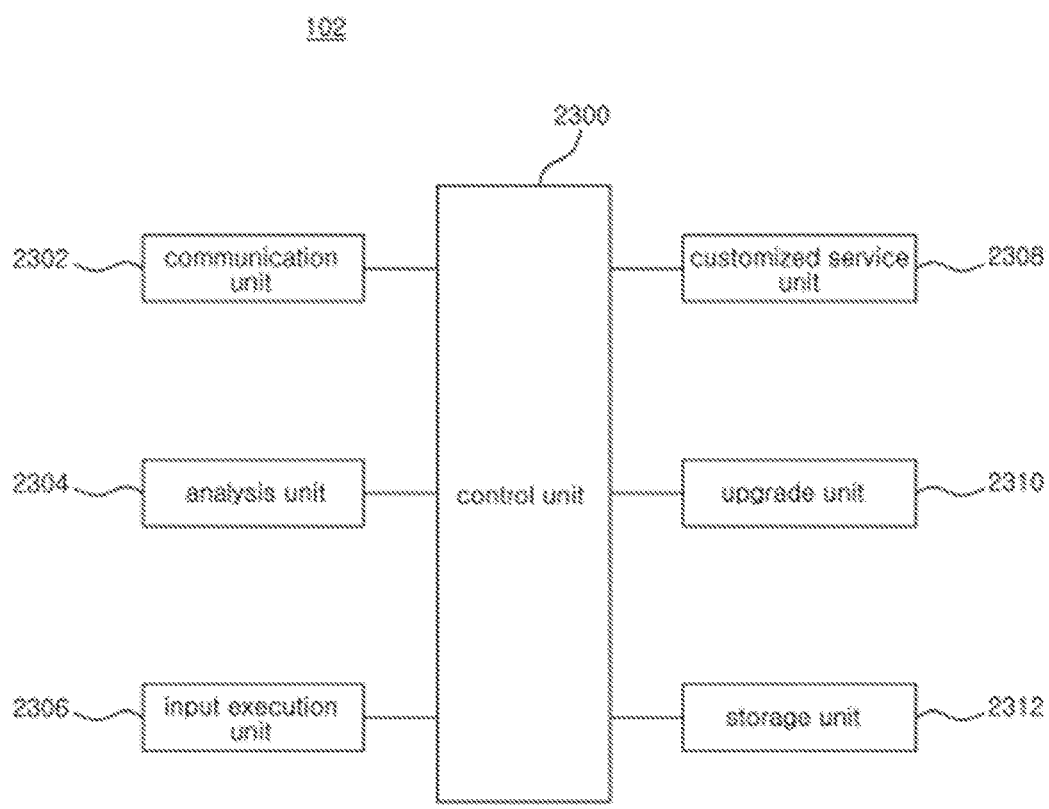
FIG. 25 is a block diagram illustrating an image processing terminal according to an embodiment of the invention.

FIG. 25 is a block diagram illustrating an image processing terminal according to an embodiment of the invention.

Referring to FIG. 25, an image processing terminal 102 according to the present embodiment can include a control unit 2300, a communication unit 2302, an analysis unit 2304, an input execution unit 2306, a customized service unit 2308, an upgrade unit 2310, and a storage unit 2312.

The communication unit 2302 may serve as a connection path to the remote control 100 or the server 104.

The communication unit 2302 can receive a control signal, related to the key selected by the user, from the remote control 100.

Also, the communication unit 2302 can receive the profile information of each user from the server 104.

Also, if it is determined that an error has occurred in the image processing terminal 102, then the communication unit 2302 can transmit information regarding the error to the server 104 or the service administrator's terminal (not shown), etc., and can receive information on the error (messages, etc.) from the server 104 or the service administrator's terminal (not shown), etc.

The analysis unit 2304 may analyze the control signal transmitted from the remote control 100.

Here, the analysis unit 2304 can analyze the control signal for the key selected by the user as received from the remote control 100, to determine whether or not an error has occurred in the service currently being used by the user or whether or not an error has occurred within the image processing terminal 102, and if so, can generate information regarding an error that has occurred.

Whereas users would generally press the key of the remote control with a constant pressure when executing the same operation or screen, if a problem occurs, users tend to press the key related to the corresponding operation more strongly than usual. Thus, the profile information of the user can be used, which contains information relevant to this situation.

That is, based on the keys selected by a user until a particular operation or screen is executed as well as the sensing levels of the selected keys included in the user profile information, the analysis unit 2304 can determine whether or not an error has occurred in the service currently being used by the user or whether or not an error has occurred within the image processing terminal 102 itself, and if so, can generate information regarding the error that has occurred.

The error-related information generated by the analysis unit 2304 can be transmitted by way of the communication unit 2302 to the server 104 or to the service administrator's terminal (not shown), etc.

The input execution unit 2306 may execute the operation corresponding to the force input, in accordance with the analysis results.

The customized service unit 2308 may provide customized services according to the user profiles. For example, when a force input is entered, the customized service unit 2308 can provide a suitable recommended program based on the user profile corresponding to the force input, in accordance to the control of the server 104.

The upgrade unit 2310 may oversee software upgrades, and for example can download software from the server 104 to upgrade the image processing terminal 102.

The storage unit 2312 can store the profile information of each user using the image processing terminal 102.

Here, the profile information of each user can include information on compensated coordinates for force inputs of the user.

Also, the profile information of each user can include information regarding the keys selected by the user until a particular operation or screen is executed as well as the sensing levels of the selected keys.

Incidentally, a 'compensated coordinate' is the resultant value obtained when the sensing level for a key lying within the boundary between specified sensing levels is compensated to one of the specified sensing levels.

Thus, the analysis unit 2304 can analyze the control signal transmitted from the remote control 100, and if the z-axis value representing the sensing level lies in the boundary between the specified sensing levels, then the input execution unit 2306 can perform the operation for a force input according to the compensated coordinate.

Also, the storage unit 2312 can store info messages corresponding to various possible errors, where the info messages can include the cause of error, contacts for the customer service center, etc.

Also, the storage unit 2312 can store various data such as control commands for the operations or screens associated with the keys of the remote control 100 and their sensing levels for each task, and the like.

The control unit 2300 can control the overall operations of the above components included in the image processing terminal 102 and can cause the error-related information generated at the analysis unit 2304 to be shown on the screen.

Figure 26:
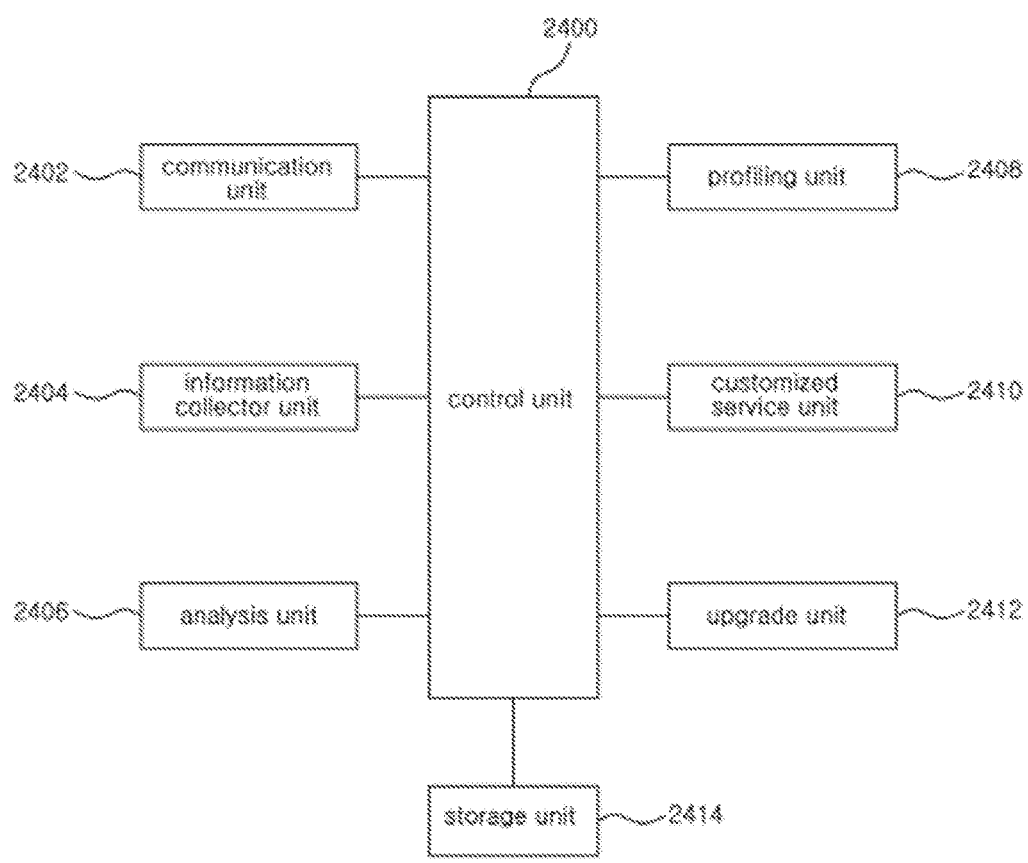
FIG. 26 is a block diagram illustrating a server, i.e. a computer processing device, according to an embodiment of the invention.

FIG. 26 is a block diagram illustrating a server, i.e. a computer processing device, according to an embodiment of the invention.

The image processing terminal 102 can further include a force input notification object unit that displays a particular object in accordance to a force input.

Referring to FIG. 26, a server 104 according to the present embodiment can include a control unit 2400, a communication unit 2402, an information collector unit 2404, an analysis unit 2406, a profiling unit 2408, a customized service unit 2410, an upgrade unit 2412, and a storage unit 2414.

The communication unit 2402 may serve as a connection path to the image processing terminal 102 and can receive identifiers (the image processing terminal's ID), coordinate values (3-dimensional coordinate values representing sensing levels) of keys on the remote control 100 selected by the user, and the like, from the image processing terminal 102.

Of course, the identifier of the corresponding key can be received together with the coordinate value of a key, and information regarding the task (operation or screen, etc.) that was currently being performed at the image processing terminal 102 when the key was selected can be received as well.

Here, the information described above can be received in real time from the image processing terminal 102 when the image processing terminal 102 receives the information from the remote control 100, and/or can be received periodically according to a predetermined cycle, such as every hour, every day, every week, every month, etc.

Also, the communication unit 2402 can receive information regarding the occurrence of an error from the image processing terminal 102, and in response, can transmit a message that includes the cause of the error, method of resolving the error, etc., to the image processing terminal 102.

Also, the communication unit 2402 can transmit the profile information for each user to the image processing terminal 102.

Incidentally, the profile information for each user may not include a separate identifier for each user, and the user can be identified from a combination of the control signal for the key (sensing level) received from the remote control 100 and information on the task being performed by the image processing terminal 102.

The information collector unit 2404 may collect information on the coordinate value of the key (including the sensing level) received from the communication unit 2402, information on the task being performed, information related to activity history, and the like.

As described above, the collection of information performed by the information collector unit 2404 can be performed immediately in real time as the image processing terminal 102 receives the information from the remote control 100, and/or can be collected periodically according to a predetermined cycle.

The analysis unit 2406 may analyze the information collected at the information collector unit 2404.

The analysis unit 2406 can analyze the control signal for a key and activity history, etc., received from the image processing terminal 102, and if the z-axis value representing the sensing level lies within a boundary between the specified sensing levels, can perform coordinate compensation whereby the sensing level can be compensated to be one of the specified sensing levels.

The information relating to how the coordinate was compensated can be included in the user profile information by the profiling unit 2408.

Also, the analysis unit 2406 can analyze the collected information to compute the statistics related to the keys selected by the user until a particular operation or screen was executed and the sensing levels for the keys selected.

The profiling unit 2408 can create and manage at least one user profile based on the analysis information produced by the analysis unit 2406, and for example, can change the names set for the user profiles. Here, creating a user profile may not necessarily entail a user authentication procedure.

Here, the profiling unit 2408 can create user profile information based on the analysis information produced by the analysis unit 2406, with information regarding the keys selected by the user until a particular operation or screen was executed and the sensing levels of the keys selected included in the user profile information.

The user profile information created at the profiling unit 2408 can be transmitted to the image processing terminal 102.

Incidentally, at the image processing terminal 102, it can be determined from the control signal of a key received from the remote control 100 whether or not there is an error in the service that the user is currently using or an error within the image processing terminal 102 itself, based on information regarding the keys selected by the user until a particular operation or screen is executed and the sensing levels for the selected keys. If an error has occurred, information regarding such error can be generated.

The customized service unit 2410 can provide customized services based on the user profile information of a corresponding user when a force input is entered. For example, a recommended list can be provided to the user.

The upgrade unit 2412 may upgrade the software of the media system, and for example can provide software to the image processing terminal 102 for an upgrade.

The storage unit 2414 may store various data, such as the profile information for each user of each image processing terminal, software, and the like.

The control unit 2400 may control the overall operations of the components included in the server 104.

The components of the embodiments described above can also be easily understood from the perspective of processes. That is, the components can each be understood as a process. Likewise, the processes of the embodiments described above can also be easily understood from the perspective of an apparatus' components.

The technical features described above can be implemented in the form of program instructions that may be performed using various computer means and can be recorded in a computer-readable medium.

Such a computer-readable medium can include program instructions, data files, data structures, etc., alone or in combination.

The program instructions recorded on the medium can be designed and configured specifically for the present invention or can be a type of medium known to and used by the skilled person in the field of computer software.

Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc.

Examples of the program of instructions may include not only machine language codes produced by a compiler but also high-level language codes that can be executed by a computer through the use of an interpreter, etc.

The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

DESCRIPTION OF REFERENCE NUMERALS

100: remote control
102: image processing terminal
104: server

What is claimed is:

1. A computer processing device comprising:
an information collector unit configured to collect information on a normal input or a force input, the normal input and the force input relating to sensing levels for a selected key on a remote control;
an analysis unit configured to set user profile information depending on the collected information, the analysis unit configured to determine whether or not a service error has occurred when a sensing level inputted via the remote control deviates from a sensing level set for the user profile information; and
a control unit configured to output information indicating the service error when it is determined that a service error has occurred based on the user profile information,
wherein the user profile information includes a profile created for each user depending on normal inputs or force inputs collected during a preset period of time,
the remote control includes plural keys, the compensation method of the input is applied to the plural keys,
and wherein the force input is an input entered with a greater pressure or a larger area than for the normal input on the key of the remote control.

2. The computer processing device of claim 1, wherein the analysis unit determines that the service error has occurred when a number of inputted sensing levels deviating from a sensing level set for the user profile information exceeds a pre-designated value.

3. The computer processing device of claim 2, wherein the control unit provides control such that the information indicating the service error is transmitted to one or more of a service-related server or a terminal of an error-management operator.

4. The computer processing device of claim 3, wherein the control unit provides control such that one or more of an identifier of the computer processing device and a contact or an address of a user using the computer processing device is additionally transmitted.

5. A method for determining a service error at a computer processing device, the method comprising:
collecting information on a normal input or a force input, the normal input and the force input relating to sensing levels of a selected key on a remote control;

setting user profile information depending on the collected information, and determining whether or not a service error has occurred when a sensing level inputted via the remote control deviates from a sensing level set for the user profile information; and
outputting information indicating the service error when it is determined that a service error has occurred,
wherein the user profile information includes a profile created for each user depending on normal inputs or force inputs collected during a preset period of time,
wherein the remote control includes plural keys, the compensation method of the input is applied to the plural keys,
and wherein the force input is an input entered with a greater pressure or a larger area than for the normal input on the key of the remote control.

* * * * *